United States Patent [19]

Reed et al.

[11] Patent Number: 5,014,131
[45] Date of Patent: May 7, 1991

[54] VECTOR FILTER FOR OPTICAL MOVING TARGET DETECTION

[75] Inventors: Irving S. Reed, Santa Monica; Irving Sperling, Costa Mesa; William A. Bundy, Redondo Beach, all of Calif.

[73] Assignee: Hughes Aircraft Company, Los Angeles, Calif.

[21] Appl. No.: 296,658

[22] Filed: Aug. 27, 1981

[51] Int. Cl.⁵ .......................... H04N 3/12; H01J 40/14
[52] U.S. Cl. .................................. 358/212; 250/332; 250/334; 250/208.1; 356/28
[58] Field of Search ...................... 340/555; 250/222.1, 250/578, 221, 338, 332, 334, 208.1; 356/28; 358/105, 212, 213, 213.27; 343/100 SA, 100 CL, 5 SA, 380, 383; 340/555; 367/100, 105

[56] References Cited

U.S. PATENT DOCUMENTS

| | | | |
|---|---|---|---|
| 3,026,475 | 3/1962 | Applebaum | 343/100 SA |
| 3,631,490 | 12/1971 | Palmieri | 367/100 |
| 3,723,642 | 3/1973 | Laakmann | 358/212 |
| 3,890,618 | 6/1975 | Speiser | 343/100 CL |
| 4,001,820 | 1/1977 | Rosenbaum et al. | 343/100 CL |
| 4,035,797 | 7/1977 | Nagy | 343/5 SA |
| 4,064,53? | 12/1977 | Lampe et al. | 358/105 |
| 4,241,350 | 12/1980 | Uffelman | 343/5 SA |
| 4,290,127 | 9/1981 | Pridham et al. | 343/100 SA |
| 4,301,471 | 11/1981 | Holscher et al. | 358/105 |
| 4,327,377 | 4/1982 | Takken | 250/578 |
| 4,389,647 | 6/1983 | Fanuele et al. | 343/5 SA |

Primary Examiner—Stephen C. Buczinski
Attorney, Agent, or Firm—William J. Streeter; Wanda K. Denson-Low

[57] ABSTRACT

A clutter rejection filter for use in detecting moving targets which may be employed in a passive optical acquisition system. The filter comprises a plurality of detector elements which view an image scene. A plurality of transversal filters are individually coupled to the plurality of detector elements. Each of the transversal filters amplitude weight signals provided by the respective detector elements as a function of time, with each of the transversal filters having a predetermined impulse response. Summing circuitry is coupled to each of the transversal filters for combining the output signals provided thereby into a single output signal for the filter. The filter provides output signals which are maximized for objects traveling at a first velocity and minimized for objects traveling at a second velocity.

8 Claims, 11 Drawing Sheets 1 mRAD./SEC.

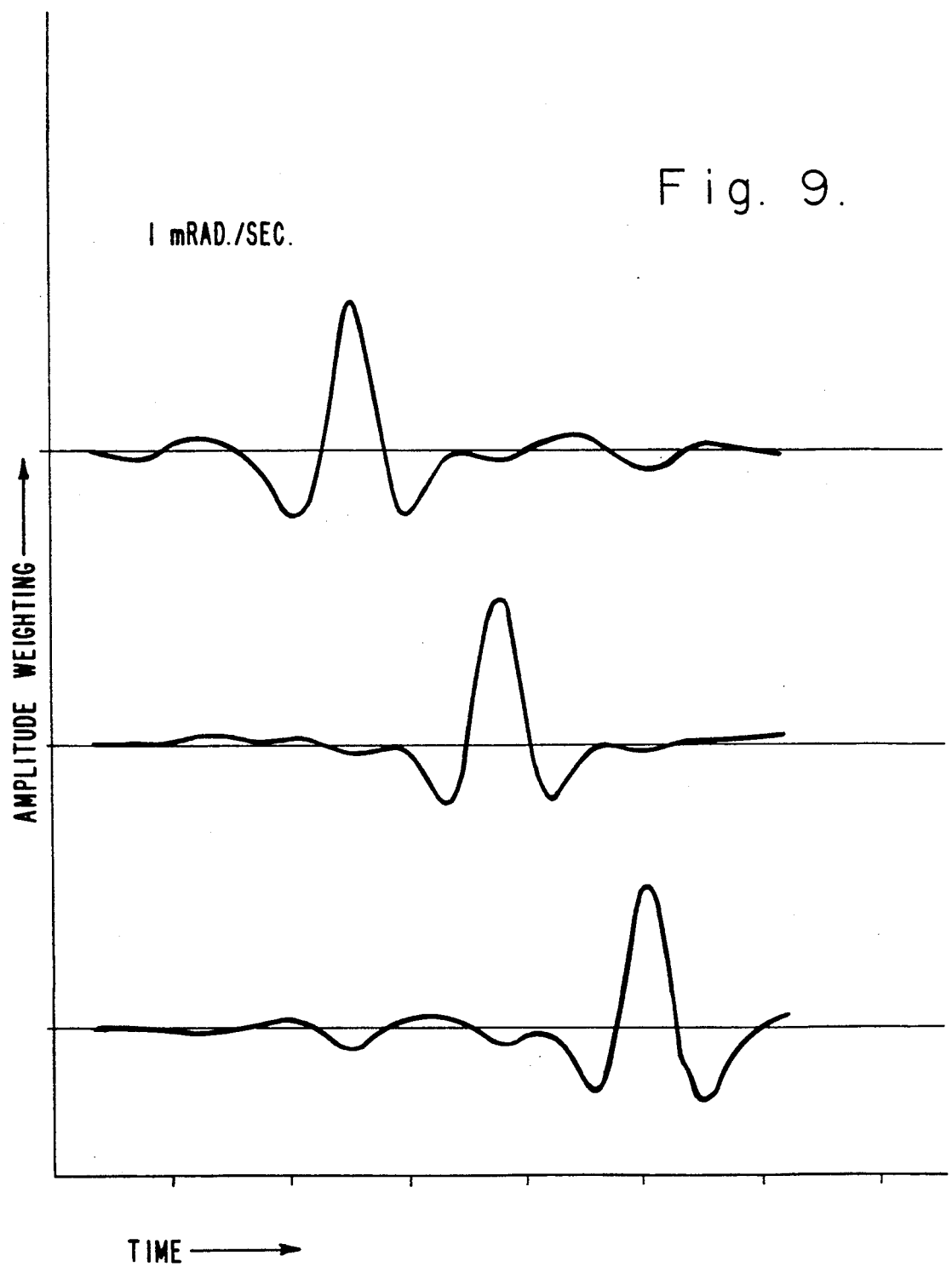

VECTOR FILTER FOR OPTICAL MOVING TARGET DETECTION

BACKGROUND OF THE INVENTION

The present invention relates generally to moving target indication systems, and more particularly, to moving target indication systems for use with passive optical detection systems.

Conventional signal processing systems for use with radar systems, and the like, have employed moving target indication systems. Typical of this type of conventional system is one which employs time delayed integration. Time delay integration, or TDI as it is commonly referred to in the art, processes detected signals in a manner such that the signal outputs from sequentially sampled detector elements are delayed by an increasing amount so that signal energy on a plurality of detector elements may be summed at the same point in time. As a result, the target signals from all the detectors synchronously add, while the background noise from each detector adds non-synchronously at the RMS value. Accordingly, the signal-to-noise ratio is improved by the square root of the number of detectors.

However, for background clutter, which is a moving noise source, the signals received from this source tend to add in the same manner as the target signals, hence, decreasing the overall signal-to-noise ratio improvement. That is to say, the clutter seen by the detectors adds in the same way as the target signals. Therefore, time delay integration is not optimal if the dominant noise source is moving background clutter. Another way of looking at time delayed integration is that the integration process reduces the effect of uncorrelated noise (background noise) while having little or no effect on correlated noise (background clutter).

Numerous systems have been devised which attempt to reduce the effects of correlated clutter sources in acquiring and tracking moving targets. Such systems include those cited in U.S. Pat. No. 3,723,642, issued to Peter Laakmann. However, no system to date has been designed for use with a passive optical detection system which allows for the optimal detection of moving targets in a cluttered and white noise environment.

Accordingly, it would be a distinct improvement in the signal processing and target detection arts to provide a system which is capable of detecting moving targets in a highly cluttered background.

It would also be an improvement in the signal processing art to provide a moving target indication system which may be utilized with a passive optical tracking system.

It would be a further improvement in the art to provide a system which is capable of optically tracking moving targets in situations where the signal-to-noise ratio is low.

SUMMARY OF THE INVENTION

Accordingly, the present invention provides for a clutter rejection filter for use in detecting moving targets which may be employed in a passive optical acquisition system, or the like. The filter of the present invention may be employed in passive target detection systems utilized in the millimeter, infrared, visible or ultraviolet spectral regions, and the like.

The clutter rejection system comprises a signal processing arrangement which processes signals received by a plurality of detector elements, such as a linear plurality, which may be a portion of a plurality of linear detector arrays, which view an image scene. The arrangement provides output signals which are maximized for objects traveling at a first velocity and minimized for objects traveling at a second velocity. The arrangement comprises a plurality of transversal filters individually coupled to the plurality of detector elements. Each of the transversal filter weights, in terms of amplitude, multiply the signals provided by the respective detector elements as a function of time, with each of the transversal filters having a predetermined impulse response. Summing circuitry is coupled to each of the transversal filters for combining the output signals provided thereby into a single output signal for the arrangement.

The impulse responses of the transversal filters are such that when objects traveling at a first velocity are sequentially viewed by the plurality of detector elements, the amplitude weighting provided by the filters has a time delay which applies maximum weighting factors to signals indicative of the objects moving at the first velocity for all of the transversal filters. Thus, the impulse responses have built-in time delays with respect to the peak weighting factors, which are a function of the target velocity of interest. The summing circuitry combines the outputs of the transversal filters such that signals indicative of objects moving at the first velocity are maximized.

For objects moving at a second velocity, which is generally the anticipated clutter velocity, the output signals provided by the summing circuitry is at a minimum. For objects or clutter moving at velocities between the first and second velocities, there is a filter mismatch. Consequently, the output signals from the summing circuitry are proportionately less than that of the first velocity.

The shapes of the impulse response curves for each of the transversal filters are a function of both the target velocity and the background drift velocity. For a given target velocity, the shape of the impulse response curve changes with varying background drift velocities. For a two detector system, the shapes of the impulse response curves are time reversed. For a three detector system, the impulse response curves associated with the first and third detectors are time reversed, while the impulse response curve associated with the second detector is a symmetrical shape. Equations are provided which predict the optimum shape of the impulse functions for use with any number of detector elements that sequentially view targets and background in the image scene.

BRIEF DESCRIPTION OF THE DRAWINGS

The features and advantages of the present invention may be more readily understood with reference to the following detailed description taken in conjunction with the accompanying drawings, wherein like reference numerals designate like structural elements, and in which:

FIGS. 9 through 11 represent impulse response curves for the filters of the embodiment shown in FIG. 8 for various drift velocities;

DETAILED DESCRIPTION OF THE INVENTION

Figure 1:
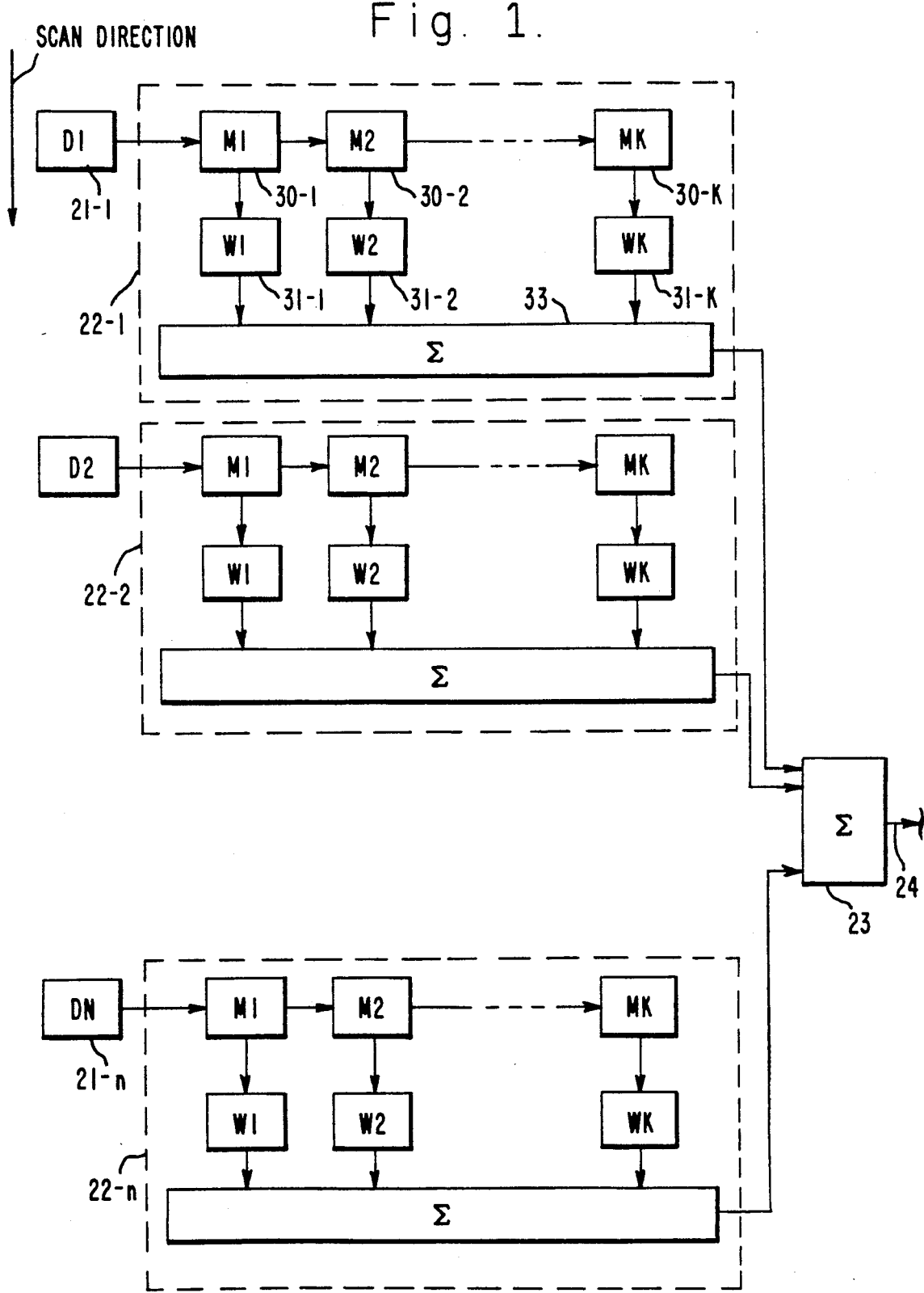
FIG. 1 illustrates a generalized signal processing arrangement in accordance with the present invention.

Referring to FIG. 1, there is shown an embodiment of a signal processing arrangement in accordance with the principles of the present invention. A linear array of detector elements 21-1, 21-2, . . . 21-n, have their respective outputs coupled to the inputs of a plurality of transversal filters 22-1, 22-2, . . . 22-n. The outputs of the transversal filters 22 are coupled to summation circuitry 23 which combines the outputs provided by the transversal filters 22. The summation circuitry 23 provides an output signal 24 which may be utilized by further processing circuitry, such as target thresholding devices, or the like.

For the purposes of this description, the detector elements 21 are considered to be one row of an entire matrix of detector elements, which are scanned sequentially by an imaging system (not shown), such that the image scene is scanned sequentially across the detectors in the direction shown by the arrow in FIG. 1. It is to be understood that the description with respect to FIG. 1, and for that matter the various embodiments disclosed herein, is provided in order to fully explain the concepts of the present invention and should not be taken as limiting. For example, although one linear array of detectors is shown in FIG. 1, the present invention is not limited to just one line of elements, but may be utilized with a plurality of lines of detectors. In addition, the detector elements which are scanned need not necessarily be along the same line, but may be diagonal across a matrix of detector elements.

The transversal filters 22, and with particular reference to the first transversal filter 22-1, comprises a plurality of memory cells 30-1, 30-2, . . . 30-k, which act as a delay line for signals provided by the first detector element 21-1. Outputs of the memory cells 30 are individually coupled to circuitry 31 which applies predetermined weighting factors to the signals received thereby. This circuitry 31, identified by boxes 31-1, 31-2, . . . 31-k, implements the impulse response associated with the matched filter 22-1. The weighted outputs of the circuitry 31 are applied to the summation circuitry 33 which sums all the inputs provided thereto into a single output signal. Each transversal filter 22-1, 22-2, . . . 22-n implements a particular predetermined impulse function which is a function of the target velocity, background clutter velocity, and the relative position of the detector in the line of detection.

The filters associated with each detector element are different with respect to their weighting factors. Stationary clutter has a velocity defined by the scan rate across the plurality of detectors 21. A typical moving target has a velocity substantially different than the clutter velocity. The shapes of the impulse response curves vary with the number of detectors employed in the system. This concept will be more fully described hereinbelow.

The shapes of the impulse response curves for each of the transversal filters 22 are optimized in terms of the signal-to-noise ratio, where the noise includes background clutter motion. Amplitude peaks in each of the impulse response curves are temporally disposed relative to one another such that when a target having the optimum target velocity is scanned across the plurality of detectors 21, there exists a predetermined time delay between detection of the target signal by the first detector element 21-1, and the detection of the target signal by detector element 21-2, and so on, based on the detector separation and the velocity of the target. This time delay is built into the shapes of the respective impulse response curves of the transversal filters 22-1, 22-2, . . . , 22-n. The time delay is such that, when the signals are summed by the summing circuitry 33 of each of the transversal filters 22-1, 22-2, . . . , 22-n, these signals tend to add to produce an n-fold increase in signal strength.

The amplitude-time histories of the various impulse response curves of the transversal filters 22-1, 22-2, . . . , 22-n are such that when a target having the optimum velocity is sequentially detected by the plurality of detectors 21, the amplitude maxima of the impulse response curves are applied by each of the transversal filters 22 to the detected signals. These amplitude-weighted signals are then summed by the summing circuitry 23 to produce the enhanced output signal. In addition, the relative shapes of the impulse response curves of the transversal filters 22 is such that for objects or clutter not moving at the optimum velocity, the summation process tends to minimize the summed contributions of the signals at the outputs of the transversal filters 22, at the output of the summing circuitry 23. This entire process will be more fully described hereinbelow.

Presented hereinbelow is a mathematical derivation of those parameters and equations which define the impulse response functions employed in the present invention. For the purposes of this derivation, a multiparallel line array of detectors elements is assumed with fixed spacing between each line. The detector elements 21 described with reference to FIG. 1 are one row of this multiparallel line array.

To any one line of a scanning, multiple, parallel-line array with fixed spacing between lines, a distant optical target may be regarded as approximately one-dimensional in the x-direction and infinitesimal in extent. The target signal of such an optical source, moving in the x-direction, may be represented as $$\sigma_o(x,t) = I(t)\delta(x - vt - x_o) \qquad (1)$$

where the target velocity v is given in equation (2), $x_o$ is the position at t=0, I(t) is the optical intensity, and $\delta(x)$ is the Dirac delta function. If $v_{at}$ and $v_s$ are the absolute target and scanning velocities, respectively, in milliradians per second (mrad/sec), then the target velocity relative to the detector array is given by:

$$v = v_{at} - v_s. \qquad (2)$$

Similarly, if $v_{ac}$ is the absolute velocity of the earth background clutter process, then the relative velocity of the background clutter over the detector array is given by:

$$v_c = v_{ac} - v_s. \qquad (3)$$

Let b(x) denote the blur, or image spreading function, of an optical system viewing the target projected along the x-axis. Then, to a first approximation, the target signal $\sigma(x, t)$ as it appears in an optical plane of the system is the convolution of $\sigma_0(x, t)$ with the blur function b(x). This convolution is given by the equation $$\begin{aligned}
\sigma(x,t) &= b(x) * \sigma_0(x,t) \\
&= \int_{-\infty}^{\infty} b(x - x') \sigma_0(x',t) dx' \\
&= I(t) \int_{-\infty}^{\infty} b(x - x')\delta(x' - vt - x_o) dx'
\end{aligned}$$

or finally,
$$\sigma(x,t) = I(t) b(x - vt - x_o) \qquad (4)$$

Let $x_1, x_2, \ldots x_N$ be the positions of the centers of the N detector lines of the array in the x-direction. Also, assume that the width of a detector in the kth line is $\Delta$ for $k = 1, 2, \ldots N$. Then the output of the kth detector with center position $x_k$ due to signal only is the integral of $\sigma(x, t)$ in equation 2 over the width $\Delta$ of the detector. That is, the output voltage $s_k(t)$, due to signal only, is $$s_k(t) = \Phi \int_{x_k - \Delta/2}^{x_k + \Delta/2} \sigma(x,t) dx \qquad (5)$$

for $k = 1, 2, \ldots N$, where $\Phi$ is the detector gain factor that converts optical intensity into a voltage signal.

Define the step function $a_\Delta(x)$, also known as the detector aperture-width function, $$\begin{aligned}
a_\Delta(x) &= 1 \text{ if } |x| \leq \Delta/2 \\
&= 0 \text{ if } |x| > \Delta/2.
\end{aligned} \qquad (6)$$

This step function of width $\Delta$ represented a detector in the x-direction. This function is symmetrical in x, in that, $$a_\Delta(x) = a_\Delta(-x) \qquad (7)$$

With the function $a_{\Delta(x)}$ *as given in equations* (6) and (7), then from equations (4) and (5), $$s_k(t) = \Phi I(t) \int_{-\infty}^{\infty} a_\Delta(x_k - x) b(x - vt - x_o) dx$$

$$s_k(t) = \Phi I(t) \int_{-\infty}^{\infty} a_\Delta(x - x_k) b(x - vt - x_o) dx$$

Letting $$u = x - vt - x_o,$$

the expression for $s_k(t)$ becomes $$s_k(t) = \Phi I(t) \int_{-\infty}^{\infty} a_\Delta(x_k - vt - u - x_o) b(u) du. \qquad (8)$$

which has the form of a convolution for $k = 1, 2, \ldots N$.

Finally, assume that the IR target of interest has a constant optical intensity I during the time of observation. Then the output voltage of the kth detector for signal alone is, from equation (8)

$$s_k(t) = \Phi I b_\Delta(x_k - vt - x_o) \qquad (9)$$

for $(k = 1, 2, \ldots n)$, where $$b_\Delta(x) = \int_{-\infty}^{\infty} a_\Delta(x - u) b(u) du = a_\Delta(x) * b(x) \qquad (10)$$

is the convolution of the detector aperture width function $a_\Delta(x)$ and the optical blur functions b(x) projected in the x-direction. The blur function can be approximated conveniently by the Gaussian function $$b(x) = e^{-x^2 2\sigma_1^2}. \qquad (11)$$

where $\sigma_1$, is the width b(x).

The signals in equation (9) may be used to find a detector system that detects an optical target moving with velocity v with respect to the detector array. To do this it is more convenient to represent the outputs $s_k(t)$ of the N detectors due to signal only as the N-component row vector $$\underline{s}(t) = (s_1(t), s_2(t), \ldots s_N(t)), \qquad (12)$$

where $s_k(t)$ is given in equation (9) for $k = 1, 2, \ldots N$. The vector $\underline{s}(t)$ is hereinafter called the signal or signal-only vector.

It is known that the optical intensities of both signal and noise add approximately in a linear fashion at the output of a photo detector. As a consequence it may be assumed that the total signal-plus-noise vector received from the N detectors has the form $$\underline{x}(t) = \underline{s}(t) + \underline{n}(t), \qquad (13)$$

where $\underline{n}(t)$ is the noise-only vector and $\underline{s}(t)$ is the signal-only vector in equation (12). The noise-only vector $\underline{n}(t)$ is assumed to be comprised of both detector noise and earth-background, clutter-type noise.

It may be assumed, for purposes of analysis, that a long-term DC average has been subtracted from $\underline{n}(t)$. This assumption makes it possible to assume that $\underline{n}(t)$ is a zero-mean vector noise process.

By utilizing equation (13), the optimum detector criterion for a multiple-line, scanning detector may be determined. The signal-plus-noise process is defined above as a vector process $\underline{x}(t)$ of N-components. The process $\underline{x}(t)$ is the sum of a signal vector $\underline{s}(t)$ and a noise-only vector $\underline{n}(t)$, where for reasons discussed previously, the components of $\underline{n}(t)$ are approximately zero-mean, stationary and jointly-Gaussian random variables for each value of t.

The detector criterion that maximizes the signal-to-noise ratio is determined hereinbelow. The signal-plus-noise process is defined above as a vector process $\underline{x}(t)$ of N components. Process $\underline{x}(t)$ is the sum of a signal vector $\underline{s}(t)$ and a noise-only vector $\underline{n}(t)$ where the components of $\underline{n}(t)$ have their long-term means removed so that $\underline{n}(t)$ is a zero-mean process.

Also, from a phenomenological viewpoint it may be assumed that the components of $\underline{n}(t)$ are wide-sense stationary. Clearly, the detector noise is stationary. Also the earth's background radiation is slowly varying in time, and for practical purposes, it also constitutes a stationary statistical process.

With the foregoing assumptions for Drocess $\underline{x}(t)$, $\underline{x}(t)$ may be filtered to sufficiently remove the noise component $\underline{n}(t)$, so that the signal $\underline{s}(t)$ may be detected. The ensuing discussion is restricted to linear filters.

A very general linear operation on vector process $\underline{x}(t)$ is expressed in the form $$y(t) = \int_{-\infty}^{\infty} \underline{k}(t-t')\underline{x}^T(t')dt' \tag{14}$$

where the vector time function $\underline{k}(t)$ is the time response function of the filter, and $\underline{x}^T$ denotes the transpose of vector $\underline{x}$, and $y(t)$, the output of the filter, is a scaler process.

The expected, or mean value, of $y(t)$ is $$m = Ey(t) = \int_{-\infty}^{\infty} \underline{k}(t-t')E\underline{x}^T(t')dt' \tag{15}$$

$$= \int_{-\infty}^{\infty} \underline{k}(t-t')\underline{s}^T(t')dt',$$

since $\underline{x}(t)$ is a zero mean process. Subtracting equation (15) from equation (14) yields $$n_o(t) = y(t) - Ey(t) = \int_{-\infty}^{\infty} \underline{k}(t-t')\underline{n}^T(t')dt' \tag{16}$$

where $n_o(t)$ is the noise remaining in the output $y(t)$ after filtering.

A measure of the magnitude of the noise $n_o(t)$ in the output is the variance or dispersion of $n_o(t)$. The variance of $n_o(t)$ is $$\sigma^2 = E[n_o(t)]^2 \tag{17}$$

$$= E \int_{-\infty}^{\infty} \underline{k}(t-t')\underline{n}^T(t')dt' \int_{-\infty}^{\infty} \underline{n}(t'')\underline{k}^T(t-t'')dt''$$

$$= \int_{-\infty}^{\infty} \int_{-\infty}^{\infty} \underline{k}(t-t')E[\underline{n}^T(t')\underline{n}(t'')]\underline{k}^T(t-t'')dt'dt''.$$

To understand the term $E\ \underline{n}^T(t')\ \underline{n}(t'')$, consider $\underline{n}(t) = (n_1(t), n_2(t))$, a two-component vector. Then $$E\underline{n}^T(t')\underline{n}(t'') = E\begin{pmatrix} n_1(t') \\ n_2(t') \end{pmatrix}(n_1(t''), n_2(t'')) \tag{18}$$

$$= \begin{pmatrix} En_1(t')n_1(t''), & En_1(t')n_2(t'') \\ En_2(t')n_1(t''), & En_2(t')n_2(t'') \end{pmatrix}$$

$$= \begin{pmatrix} R_{11}(t'-t''), & R_{12}(t'-t'') \\ R_{21}(t'-t''), & R_{22}(t'-t'') \end{pmatrix},$$

where the fact that $n_1(t)$ and $n_2(t)$ are stationary processes is used to establish that the cross covariances $R_{kj}(t'-t'')$ are a function only of the difference in times $t'$ and $t''$. From equation (18), the corresponding general matrix outer product in equation (17) is given by $$E\underline{n}^T(t')\underline{n}(t'') = \underline{R}(t'-t'') = \tag{19}$$

$$\begin{pmatrix} R_{11}(t'-t''), & R_{12}(t'-t''), & \ldots, & R_{1N}(t'-t'') \\ R_{21}(t'-t''), & R_{22}(t'-t''), & & \\ \cdot & \cdot & & \cdot \\ \cdot & \cdot & & \cdot \\ \cdot & \cdot & & \cdot \\ R_{N1}(t'-t''), & R_{N2}(t'-t''), & \ldots, & R_{NN}(t'-t'') \end{pmatrix}$$

and is the cross-covariance matrix of process $\underline{n}(t)$. Using equation (19) in equation (17) yields the variance of the output noise process $n_o(t)$ of filter $\underline{k}(t)$ and is given by $$\sigma^2 = \int_{-\infty}^{\infty} \underline{k}(t-t')\underline{R}(t'-t'')\underline{k}^T(t-t'')dt'dt''. \tag{20}$$

It simplifies $\int$ equation (20) to let $t_1 = t-t'$ and $t_2 = t-t''$. Making this change results in $$\sigma^2 = \int_{-\infty}^{\infty} \int_{-\infty}^{\infty} \underline{k}(t_1)\underline{R}(t_2-t_1)\underline{k}^T(t_2)\,dt_1 dt_2. \tag{21}$$

In order to change this double integral into a single integral it is necessary to use the Fourier transforms of $\underline{k}(t)$ and $\underline{R}(t)$. These transforms are $$\underline{G}(\omega) = \int_{-\infty}^{\infty} e^{-i\omega t}\underline{R}(t)dt \tag{22}$$

and $$\underline{H}(\omega) = \int_{-\infty}^{\infty} e^{-i\omega t}\underline{k}(t)dt.$$

$\underline{G}(\omega)$, an $N \times N$ matrix, is the power spectrum or spectral density matrix of process $\underline{n}(t)$. $\underline{H}(\omega)$, an N-component vector, is the frequency response function of filter $\underline{k}(t)$. The inverse transforms of $\underline{G}(\omega)$ and $\underline{H}(\omega)$ are $$\underline{R}(t) = \frac{1}{2\pi} \int_{-\infty}^{\infty} e^{i\omega t}\underline{G}(\omega)d\omega \tag{23}$$

$$\underline{k}(t) = \frac{1}{2\pi} \int_{-\infty}^{\infty} e^{i\omega t}\underline{H}(\omega)d\omega.$$

Substituting equations (23) and (22) in the first integral of equation (21) results in $$\int_{-\infty}^{\infty} \underline{k}(t_1)\underline{R}(t_2-t_1)dt_1 \tag{24}$$

-continued $$= \int_{-\infty}^{\infty} \underline{k}(t_1) \left( \frac{1}{2\pi} \int_{-\infty}^{\infty} e^{i\omega(t_2-t_1)}\underline{G}(\omega)d\omega \right) dt_1$$

$$= \frac{1}{2\pi} \int_{-\infty}^{\infty} e^{i\omega t_2} \left( \int_{-\infty}^{\infty} e^{-i\omega t_1}\underline{k}(t_1) \, dt_1 \right) \underline{G}(\omega)d\omega$$

$$= \frac{1}{2\pi} \int_{-\infty}^{\infty} e^{i\omega t_2}\underline{H}(\omega)\underline{G}(\omega)d\omega.$$

This is the convolution of $\underline{k}(t)$ and $\underline{R}(t)$ in terms of their transforms $\underline{H}(\omega)$ and $\underline{G}(\omega)$, respectively. Substituting equation (24) into equation (21) yields $$\sigma^2 = \int_{-\infty}^{\infty} \left( \frac{1}{2\pi} \int_{-\infty}^{\infty} e^{i\omega t_2}\underline{H}(\omega)\underline{G}(\omega)d\omega \right) \underline{k}^T(t_2)dt_2 \quad (25)$$

$$= \frac{1}{2\pi} \int_{-\infty}^{\infty} \underline{H}(\omega)\underline{G}(\omega) \left( \int_{-\infty}^{\infty} e^{i\omega t_2}\underline{k}^T(t_2)dt_2 \right) d\omega$$

$$= \frac{1}{2\pi} \int_{-\infty}^{\infty} \underline{H}(\omega)\underline{G}(\omega) \overline{\underline{H}}^T(\omega)d\omega,$$

where $\overline{\underline{H}}(\omega)$ denotes the complex conjugate of $\underline{H}(\omega)$.

Note at this point an important property of the cross-covariance matrix $\underline{R}(\tau)$, defined in equation (19). From equation (19) the transpose of $\underline{R}(\tau)$ is $$\underline{R}^T(\tau) = E\underline{n}^T(t)\underline{n}(t + \tau) = E\underline{n}^T(t + \tau - \tau)\underline{n}(t + \tau) \quad (26)$$

$$= E\underline{n}^T(t' - \tau)\underline{n}(t') = \underline{R}(-\tau),$$

where $t' = t + \tau$ for all values of t. This property of $\underline{R}(\tau)$ may be used by (22) to find $\underline{G}^T(\omega)$, the transpose of $\underline{G}(\omega)$ given by $$\underline{G}^T(\omega) = \int_{-\infty}^{\infty} e^{-i\omega\tau}\underline{R}^T(\tau)d\tau = \int_{-\infty}^{\infty} e^{-i\omega\tau}\underline{R}(-\tau)d\tau$$

$$= \int_{-\infty}^{\infty} e^{i\omega\tau}\underline{R}(\tau)d\tau.$$

Taking the complex conjugate yields $$\overline{\underline{G}}^T(\omega) = \underline{G}(\omega). \quad (27)$$

Thus $\underline{G}(\omega)$, the spectral density matrix, is a Hermitian symmetric matrix.

It may be assumed that the components of $\underline{n}(t)$ are approximately jointly Gaussian in distribution. Therefore, $n_o(t)$, the output of the filter k(t), is also Gaussian. Accordingly, the probability of detecting a signal in noise for a fixed false alarm rate is a monotonically increasing function of the so-called output signal-to-noise ratio, and is given by $$(S/N)_o = \frac{m^2}{\sigma^2}, \quad (28)$$

where m is the expected value and $\sigma^2$ is the variance of the output y(t) of the filter $\underline{k}(t)$. Thus, under the assumption of Gaussian noise, the optimum linear filter $\underline{k}(t)$, or $\underline{H}(\omega)$ for detecting the signal $\underline{s}(t)$ is obtained by maximizing $(S/N)_o$ as given in equation (28).

To maximize the signal-to-noise ratio it is first necessary to express m in terms of $\underline{H}(\omega)$ and the Fourier transform of the signal vector $\underline{s}(t)$, given by $$\underline{S}(\omega) = \int_{-\infty}^{\infty} e^{-i\omega t}\underline{s}(t)dt. \quad (29)$$

From equations (15), (22) and (29), this is $$m = Ey(t) = \int_{-\infty}^{\infty} \underline{k}(t - t')\underline{s}^T(t')dt' \quad (30)$$

$$= \frac{1}{2\pi} \int_{-\infty}^{\infty} e^{i\omega t}\underline{H}(\omega)\underline{S}^T(\omega)d\omega,$$

the convolution of $\underline{k}(t)$ and $\underline{s}(t)$.

To find the filter $\underline{H}(\omega)$ that maximizes the signal-to-noise ratio $(S/N)_o$, the Schwartz inequality is employed in the following form $$\left( \int_{-\infty}^{\infty} \underline{A}(\omega)\underline{B}^T(\omega)d\omega \right)^2 \leq \quad (31)$$

$$\int_{-\infty}^{\infty} \underline{A}(\omega)\overline{\underline{A}}^T(\omega)d\omega \int_{-\infty}^{\infty} \underline{B}(\omega)\overline{\underline{B}}^T(\omega)d\omega$$

where $\underline{A}(\omega)$ and $\underline{B}(\omega)$ are N-component vectors.

Substituting equations (25) and (30) into equation (28) results in $$(S/N)_o = \frac{m^2}{\sigma^2} = \frac{1}{2\pi} \frac{\left( \int_{-\infty}^{\infty} e^{i\omega t}\underline{H}(\omega)\underline{S}^T(\omega)d\omega \right)^2}{\int_{-\infty}^{\infty} \underline{H}(\omega)\underline{G}(\omega)\overline{\underline{H}}^T(\omega)d\omega} \quad (32)$$

as the signal-to-noise, using filter $\underline{H}(\omega)$. $\underline{G}(\omega)$ is a symmetrical Hermetian matrix, and it is well known that a Hermitian matrix has a square root. Thus there exists a matrix $\underline{G}^{\frac{1}{2}}(\omega)$ with the property $$\underline{G}^{\frac{1}{2}}(\omega) \underline{G}^{\frac{1}{2}}(\omega) = \underline{G}(\omega),$$

where $\underline{G}(\omega)$ is the spectral density matrix.

Since detector noise is part of all components of noise vector $\underline{n}(t)$, it may be shown that the cross-covariance matrix $\underline{R}(\tau$ of $\underline{n}(t)$ is nonsingular. Using equation (22), this fact may be used to prove that $\underline{G}(\omega)$ is nonsingular. As a consequence the inverse $\underline{G}^{-\frac{1}{2}}(x)$ of the square root of $\underline{G}(x)$ exists. Thus, the integrand of the numerator of (32) may be multiplied by $$\underline{G}^{-\frac{1}{2}}(x) \underline{G}^{\frac{1}{2}}(x) = I.$$

Accordingly, $$(S/N)_o = \frac{1}{2\pi} \frac{\left(\int_{-\infty}^{\infty} [\underline{H}(\omega)\underline{G}^{\frac{1}{2}}(\omega)][\underline{G}^{-\frac{1}{2}}(\omega)\underline{S}^T(\omega)e^{i\omega\eta}]d\omega\right)^2}{\int_{-\infty}^{\infty} \underline{H}(\omega)\underline{G}(\omega)\underline{H}^T d\omega} \quad (34)$$

$$= \frac{1}{2\pi} \frac{\left(\int_{-\infty}^{\infty} [\underline{H}(\omega)\underline{G}^{\frac{1}{2}}(\omega)][\overline{\underline{S}(\omega)\underline{G}^{-\frac{1}{2}}(\omega)e^{-i\omega\eta}}]^T d\omega\right)^2}{\int_{-\infty}^{\infty} \underline{H}(\omega)\underline{G}(\omega)\overline{\underline{H}}^T d\omega}$$

Now let $$\underline{A}(\omega) = \underline{H}(\omega)\underline{G}^{\frac{1}{2}}(\omega),$$

and $$\underline{B}(\omega) = \underline{S}(\omega)\underline{G}^{-\frac{1}{2}}(\omega)e^{-i\omega t}$$

in equation (31), the Schwartz inequality. Then the signal-to-noise ratio in (34) is bounded above as follows:

$$(S/N)_o \leq \int_{-\infty}^{\infty} [\underline{H}(\omega)\underline{G}^{\frac{1}{2}}(\omega)][\overline{\underline{H}(\omega)\underline{G}^{\frac{1}{2}}(\omega)}]^T d\omega \times$$

$$\int_{-\infty}^{\infty} [\underline{S}(\omega)\underline{G}^{-\frac{1}{2}}(\omega)e^{-i\omega\eta}][\overline{\underline{S}(\omega)G^{-\frac{1}{2}}(\omega)e^{-i\omega\eta}}]^T d\omega \div$$

$$\int_{-\infty}^{\infty} \underline{H}(\omega)\underline{G}(\omega)\overline{\underline{H}}^T(\omega)d\omega =$$

$$\frac{1}{2\pi} \frac{\int_{-\infty}^{\infty} \underline{H}(\omega)\underline{G}(\omega)\overline{\underline{H}}^T(\omega)d\omega \int_{-\infty}^{\infty} \overline{\underline{S}}(\omega)\underline{G}^{-1}(\omega)\underline{S}(\omega)d\omega}{\int_{-\infty}^{\infty} \underline{H}(\omega)\underline{G}(\omega)\overline{\underline{H}}^T(\omega)d\omega}$$

Thus, $$(S/N)_o \leq \frac{1}{2\pi} \int_{-\infty}^{\infty} \overline{\underline{S}}(\omega)\underline{G}^{-1}(\omega)\underline{S}^T(\omega)d\omega. \quad (35)$$

The bound of the signal-to-noise ratio on the right hand side of equation (35) holds for all possible linear filters $\underline{H}(\omega)$. Consider the filter $$\underline{H}_1(\omega) = e^{-\omega t}\overline{\underline{S}}(\omega)\underline{G}^{-1}(\omega). \quad (36)$$

Substituting $\underline{H}_1(\omega)$ for $\underline{H}(\omega)$ in equation (32) results in $$(S/N)_o = \frac{1}{2\pi} \frac{\left(\int_{-\infty}^{\infty} e^{i\omega t}e^{-i\omega t}\overline{\underline{S}}(\omega)\underline{G}^{-1}(\omega)\underline{S}^T(\omega)d\omega\right)^2}{\int_{-\infty}^{\infty} \overline{\underline{S}}(\omega)\underline{G}^{-1}(\omega)\underline{S}^T(\omega)d\omega} \quad (36a)$$

$$= \frac{1}{2\pi} \frac{\left(\int_{-\infty}^{\infty} \overline{\underline{S}}(\omega)\underline{G}^{-1}(\omega)\underline{S}^T(\omega)d\omega\right)^2}{\int_{-\infty}^{\infty} \overline{\underline{S}}(\omega)\underline{G}^{-1}(\omega)\underline{S}^T(\omega)d\omega}$$

$$= \frac{1}{2\pi} \int_{-\infty}^{\infty} \overline{\underline{S}}(\omega)\underline{G}^{-1}(\omega)\underline{S}^T(\omega)d\omega.$$

Substituting the filter $\underline{H}_1(\omega)$ in equation (32) yields a signal-to-noise ratio $(S/N)_o$ that attains the bound for $(S/N)_o$. Hence this is an optimum filter for detecting signal vector $\underline{s}(t)$ in the presence of noise $\underline{n}(t)$.

For $N=2$ consider the optimum filter given in equation (36). The transform of the signal vector is $$\underline{S}(\omega) = (S_1(\omega), S_2(\omega)). \quad (37)$$

Also from equation (22), the spectral density matrix is $$\underline{G}(\omega) = \begin{pmatrix} G_{11}(\omega), & G_{12}(\omega) \\ G_{21}(\omega), & G_{22}(\omega) \end{pmatrix},$$

where $$G_{21}(\omega) = \overline{G_{12}(\omega)}.$$

The inverse of $\underline{G}(\omega)$ is $$\underline{G}^{-1}(\omega) = \frac{1}{|\underline{G}(\omega)|} \begin{pmatrix} G_{22}(\omega), & -G_{21}(\omega) \\ -G_{12}(\omega), & G_{11}(\omega) \end{pmatrix}. \quad (38)$$

where $$|\underline{G}(\omega)| = G_{11}(\omega)G_{22}(\omega) - G_{12}(\omega)G_{21}(\omega),$$

the determinant of matrix $\underline{G}(\omega)$. Substituting equations (37) and (38) in equation (36) results in $$H_1(\omega) = \frac{e^{-i\omega t}}{|\underline{G}(\omega)|} (\overline{S}_1(\omega)G_{22}(\omega) - \overline{S}_2(\omega)G_{12}(\omega)), \quad (39)$$

and

-continued $$H_2(\omega) = \frac{e^{-i\omega t}}{|\underline{G}(\omega)|} (\overline{S}_2(\omega)G_{11}(\omega) - \overline{S}_1(\omega)G_{21}(\omega)),$$

where $$|\underline{G}(\omega)| = G_{11}(\omega)G_{22}(\omega) - G_{12}(\omega)G_{21}(\omega)$$

are the components of the optimum filter $\underline{H}(\omega)$ for detecting signal $\underline{s}(t)$ in noise $\underline{n}(t)$.

To find the optimum filter $\underline{H}(\omega)$, as given in equation (36), the transform $\underline{S}(\omega)$ of the signal vector $\underline{s}(t)$ must be found. The kth component of vector $\underline{s}(t)$ is determined from equations (9 and (1), and is given by $$s_k(t) = \Phi I b_\Delta(x_k - vt - x_o) \qquad (40)$$
$$= C b_\Delta(x_k + |v|t - x_o),$$

where $C = \Phi I$, and $b_\Delta(x)$ from equation (10) is the convolution of the detector width function $a_\Delta(x)$ and the one-dimensional blur function $b(x)$.

Let the blur function be approximated by the Gaussian function defined in equation (11), $$b(x) = e^{-x^2 2\sigma_1^2}.$$

where $b(x)$ has a width $\sigma_1$. The Fourier transforms of $a_\Delta(x)$ and $b(x)$ are given by $$A_\Delta(k) = \int_{-\infty}^{\infty} e^{-ikx} a_\Delta(x) dx = \frac{\sin(\Delta k/2)}{k/2} \qquad (41)$$

and $$B(k) = \int_{-\infty}^{\infty} e^{ikx} b(x) dx = \sigma_1 \sqrt{2\pi} \, e^{-(2\pi\sigma_1 k)^2/2},$$

where k is the wave number in radians per unit distance. In terms of $A_\Delta(k)$ and $B(k)$ in (41), the convolution given in equation (10) for $b_\Delta(x)$ is $$b_\Delta(x) = \frac{1}{2\pi} \int_{-\infty}^{\infty} e^{ikx} B(k) A_\Delta(k) dk,$$

so that the inverse transform is $$B_\Delta(k) = B(k) A_\Delta(k) = \int_{-\infty}^{\infty} e^{-ikx} b_\Delta(x) dx. \qquad (42)$$

The kth component of vector $\underline{S}(\omega)$ in equation (29) is from equation (40)

$$S_k(\omega) = \int_{-\infty}^{\infty} e^{-i\omega t} s_k(t) dt$$
$$= C \int_{-\infty}^{\infty} e^{-i\omega t} b_\Delta(x_k + |v|t - x_o) dt.$$

Making the change of variables $x_k + |v|t - x_o = x$, $$S_k(\omega) = C_1 e^{i\omega(x_k - x_o)/|v|} \int_{-\infty}^{\infty} e^{-i\frac{\omega}{v}x} b_\Delta(x) dx,$$

where $C_1 = C/|v|$.

The integral in this expression for $S_k(w)$ is evaluated in equation (42). Hence, $$S_k(\omega) = C_1 e^{i\omega(x_k - x_o)/|v|} B_{66}(\omega/|v|) \qquad (43)$$

for (k = 1, 2, ... N), where $S_k(\omega)$ is the kth component of vector $\underline{S}(\omega)$ in equation (29) and where $B_\Delta(\omega/|v|)$ is given in equation (42).

For the case N = 2, let $x_2 - x_1 = d$ and $x_0 = x_1$. Then by equation (43), $$\underline{S}(\omega) = C_1 I B_\Delta(\omega/|v|)(1, e^{i\omega d/|v|}) \qquad (44)$$

is the two component vector for $\underline{S}(\omega)$. Here $B_{\Delta(k)}$ is defined in equation (42), d is the separation between detector fences and $|v|$ is the magnitude of the target velocity relative to a frame fixed to the detector array.

The functions $B_{\Delta(\omega/|v|)}$ defined by equations (42) and (43) is the frequency response function of the kth detector in the array of N detectors. Both the signal, given in equation (43), and the earth background noise pass through this filter.

To design the optimum filter as given in equation (36), it is also necessary to find the cross-covariance matrix $\underline{R}(\tau)$ of equation (19) and to derive from it the spectral density matrix $\underline{G}(\omega)$. In order to do this, let n(x,t) denote the moving earth background noise process as observed from the frame of reference attached to the multiple array of scanning detectors. Also let $n_1(x,t)$ denote the same earth background noise process but now observed from a coordinate frame that is fixed or stationary with respect to the earth clutter scene.

By definition, the process $n_1(x, t)$ appears to be moving with velocity vc relative to the scanning array of detectors, where vc is given in equation (2). Thus, processes n(x, t) and $n_1(x, y)$ are related in the manner $$n(x, t) = n_1(x - v_c t, t) \qquad (45)$$

The quantity nl(x, t) is stationary in time and may be termed quasi-stationary, spatially. Hence, if a long-term mean has been subtracted out of the earth background process, leaving $n_1(x, t)$, it is reasonable to assume, as a first approximation, that $n_1(x, t)$ is a zero mean, wide-sense stationary space-time process. If such is the case, the covariance function of process $n_1(x, t)$ is $$E n_1(x, t) n_1(x', t') = R_{nl}(x - x', t - t'), \qquad (46)$$

and is a function only of the difference in the distances x and x' and the times t and t'.

From equations (46) and (45) the covariance of the moving background noise process n(x, t) may be determined. This is given by $$E n(x,t) n(x',t') = E n_1(x - v_c t, t) n_1(x' - v c t', t')$$
$$= R_n(x - v_c t - [x' - v_c t'], t - t') = R_n(x - x' - v_c(t - t'), t - t').$$

Thus, the covariance $R_n(x - x', t - t')$ of the moving background noise process is related to the corresponding non-moving process $R_{nl}(x - x', t - t')$ by the equation $$R_n(x - x', t - t') = R_{nl}(x - x' - v_c(t - t'), t - t''), \qquad (47)$$

where $v_c$ is the velocity of the earth background relative to a coordinate system attached to the scanning array of detectors.

If $x_1, x_2, \ldots x_N$ are the positions of the centers of the N detector arrays, define $$n_{ck}(t) = n(x_k,t) \text{ for } (k=1, 2 \ldots N), \tag{48}$$

where $n(x_k,t)$ is given by equation (45). Then the vector process, $$n_c(t) = (n_{c1}(t), n_{c2}(t), \ldots, n_{cN}(t)) \tag{49}$$

is the moving clutter or earth background process as observed at the centers of the N detectors. From equation (19), the cross-covariance matrix associated with the moving clutter process only is $$\underline{R}_c(t'-t'') = E \underline{n}_c^T(t') \underline{n}_c(t''), \tag{50}$$

where $n_c(t)$ is vector clutter process in equation (49). Likewise, the spectral density matrix for the moving clutter process only is given in equation (22) as $$\underline{G}_c(\omega) = \int_{-\infty}^{\infty} e^{-i\omega\tau} \underline{R}_c(\tau) d\tau. \tag{51}$$

To illustrate the use of equations (50) and (51) consider again the case N=2. Let $d = x_1 - x_2$ and $\tau = t' - t''$. Then $$\underline{R}_c(\tau) = E \begin{pmatrix} n_{c1}(t') \\ n_{c2}(t') \end{pmatrix} (n_{c1}(t''), n_{c2}(t'')) \tag{52}$$

$$= E \begin{pmatrix} n(x_1, t')\, n(x_1, t''), & n(x_1, t')\, n(x_2, t'') \\ n(x_2, t')\, n(x_1, t''), & n(x_2, t')\, n(x_2, t'') \end{pmatrix}$$

$$= \begin{pmatrix} R_n(0, \tau), & R_n(d, \tau) \\ R_n(d, \tau), & R_n(0, \tau) \end{pmatrix} = \begin{pmatrix} R_{c11}(\tau), & R_{c12}(\tau) \\ R_{c21}(-\tau), & R_{c22}(\tau) \end{pmatrix}.$$

Also, $$\underline{G}_c(\omega) = \int_{-\infty}^{\infty} e^{-i\omega\tau} \underline{R}(\tau) d\tau$$

$$= \int_{-\infty}^{\infty} e^{-i\omega\tau} \begin{pmatrix} R_n(0, \tau), & R_n(d, \tau) \\ (R_n(d, -\tau), & R_n(0, \tau) \end{pmatrix} d\tau$$

$$= \begin{pmatrix} G_{c11}(\omega), & G_{c12}(\omega) \\ G_{c21}(\omega), & G_{c22}(\omega) \end{pmatrix},$$

so that $$G_{n11}(\omega) = \int_{-\infty}^{\infty} e^{-i\omega\tau} R_n(0, \tau) d\tau = \overline{G}_{n22}(\omega) \tag{53}$$

and $$G_{n12}(\omega) \int_{-\infty}^{\infty} e^{-i\omega\tau} R_n(d, \tau) d\tau = G_{n21}(\omega).$$

Experiments in image processing and flight tests with IR equipment have shown repeatedly that the non-moving earth background process $n_1(x,t)$ in most cases may be approximately by a wide-sense Markov process. Assuming this to be true, then the covariance function for $n_1(x,t)$ has the form $$R_{n1}(d,\tau) = N_1 e^{-\alpha|d| - \beta|\tau|}, \tag{54}$$

where $1/\alpha$ is the correlation length, $1/\beta$ is the correlation time and $N_1$ is the clutter intensity constant. Thus, from equation (47)

$$R_n(d,\tau) = N_1 e^{-\alpha|d - v_c\tau| - \beta|\tau|} \tag{55}$$

is the covariance function of the moving earth background process $n(x,t)$, given in equation (45).

Using equation (55) for the case N=2 yields $$R_{c11}(\tau) = N_1 e^{-(\alpha|v_c| + \beta)\tau} = R_{c22}(\tau)$$

and $$R_{c12}(\tau) = N_1 e^{-\alpha|d - v_c\tau| - \beta|\tau|} = R_{c21}(-\tau) \tag{56}$$

for the elements of the covariance matrix $R_c(\tau)$.

To compute the elements of $G_c(\omega)$ in equation (51), equation (3) is used to obtain $$v_c = -|v_c|. \tag{57}$$

Using equations (57) in (56), it may be shown that $$G_{c11}(\omega) = \frac{2N_1(\alpha|v_c| + \beta)}{\omega^2 + (\alpha|v_c| + \beta)^2} = G_{c22}(\omega), \tag{58}$$

and $$G_{c12}(\omega) = \frac{2N_1}{\alpha|v_c| - \beta + i\omega} \left( \frac{\alpha|v_c|e^{-(\beta - i\omega)d/v_c}}{(\alpha|v_c| + \beta - i\omega)} - \frac{\beta e^{-\alpha d}}{\alpha|v_c| + \beta + i\omega} \right)$$

$$= G_{c21}(\omega)$$

where $G_{c11}(\omega)$ and $G_{c12}(\omega)$ are the elements of the spectral density matrix $G_c(\omega)$ for N=2.

The spectral density matrix at the output of the multiple detector array may be determined. From equations (42) and (43), the frequency response function of the kth detector is given by $$C_1 B_\Delta(\omega/|v|). \tag{59}$$

where $B_\Delta(k)$ is defined in equation (42). Thus, the power spectral matrix at the output of the detectors due to the moving earth background process is given by $$\underline{G}_o(\omega) = \gamma |B_\Delta(\omega/|v|)|^2 \underline{G}_c(\omega), \tag{60}$$

where $\gamma$ is a constant.

To obtain the total spectral density matrix $G(\omega)$ needed in the optimum filter $H(\omega)$ in equation (36), it is necessary to add the effects of detector noise. Clearly, the internal noise of one detector is completely uncorrelated with respect to the internal noise of any other detector. This means that a diagonal matrix of the form $$\underline{G}_d(\omega) = \text{diag}(N_0, N_0, \ldots N_0). \tag{61}$$

where $N_0$ is photon noise intensity per unit bandwidth for each detector, needs to be added to $G_o(\omega)$ to obtain $GG(\omega)$. Thus, the total spectral density matrix is $$\underline{G}(\omega) = \underline{G}_c(\omega) + \underline{G}_d(\omega). \tag{62}$$

where $\underline{G}_o(\omega)$ is the spectral density matrix of the clutter, from equation (60), and $\underline{G}_d(\omega)$ is the spectral density matrix of the detector noise from equation (61).

Using equations (58) and (61), yields $$G_{11}(\omega) = \gamma[B_\Delta(\omega/v)G_{c11}(\omega) + N_0] = \overline{G_{22}(\omega)}$$

and $$G_{12}(\omega) = \gamma B_\Delta(\omega/v)G_{c12}(\omega) = \overline{G_{21}(\omega)}, \quad (63)$$

where $G_{c11}(\omega)$ and $G_{c21}(\omega)$ are given in equation (58) as the elements of the total spectral density matrix $\underline{G}(\omega)$ for $N=2$.

For $N=2$ the optimum vector filter $\underline{H}(\omega)$ in equation (36) is obtained from $\underline{G}(\omega)$ in equation (63) and $\underline{S}(\omega)$ in equation (44). Thus, for this case, $$\begin{aligned}\underline{H}(\omega) &= \underline{S}(\omega)\underline{G}^{-1}(\omega) \\ &= C_1 B(\omega/|v|)(1, e^{-i\omega d/|v|})\underline{G}^{-1}(\omega)\end{aligned} \quad (64)$$

with $$\begin{aligned}\underline{G}^{-1}(\omega) &= \frac{1}{\Delta}\begin{pmatrix} G_{22}(\omega), & -G_{22}(\omega) \\ -G_{12}(\omega), & G_{11}(\omega) \end{pmatrix} \\ &= \frac{1}{\Delta}\begin{pmatrix} G_{11}(\omega), & -\overline{G}_{12}(\omega) \\ -G_{12}(\omega), & G_{11}(\omega) \end{pmatrix}\end{aligned} \quad (65)$$

where $$\Delta = (G_{11}(\omega))^2 - |G_{12}(\omega)|^2, \quad (66)$$

and where $B(K)$, $A_\Delta(K)$ are given in equation (42) and $G_{11}(\omega)$ and $G_{12}(\omega)$ are given in equation (63).

If equations (44) and (63) are substituted in equation (36a), the signal-to-noise ratio for the optimum filter $H(\omega)$ is obtained. Thus, for $N=2$, $$\begin{aligned}(S/N)_0 &= \frac{1}{2\pi}\int_{-\infty}^{\infty}\underline{S}(\omega)G^{-1}(\omega)\underline{S}^T(\omega)d\omega \\ &= \frac{C_1^2}{2\pi}\int_{-\infty}^{\infty}|B_\Delta(\omega/|v|)|^2 \times \\ &\quad (1, e^{-i\omega\tau_1})\begin{pmatrix} G_{11}(\omega), & -\overline{G_{12}(\omega)} \\ G_{12}(\omega), & G_{11}(\omega) \end{pmatrix}\begin{pmatrix} 1 \\ e^{i\omega\tau_1} \end{pmatrix}d\omega \\ &= \frac{C_1^2}{\pi}\int_{-\infty}^{\infty}|B_\Delta(\omega/|v|)|^2 (G_{11}(\omega) - \\ &\quad R_e[G_{12}(\omega)e^{-i\omega\tau_1}])d\omega,\end{aligned} \quad (67)$$

where $\tau_1 = d/|v|$ and $G_{11}(\omega)$ and $G_{12}(\omega)$ are given in equation (63).

The application of the previous vector matched filter derivation to a general two-dimensional vector process provides an optimum filter for detection with two detectors. The theoretical performance curves and filter design for the two detector case may be generated if a model for the covariance matrix $R(t)$ is assumed. The clutter model used for this analysis is given in equation (55. Elements of the covariance matrix have the form $$R(d, \tau) = N_1 e^{-\alpha|d - v\tau| - \beta|\tau|}.$$

where $N_1$ is the variance, c is the inverse correlation length, $\beta$ is the inverse correlation time, d is the detector separation, v is the drift speed, and $\tau$ is the target delay time between detectors.

The clutter model physically represents the covariance matrix of an exponentially correlated background (in space and time) as seen by an observer moving with speed $|v|$. The components of the 2 by 2 covariance matrix are the Fourier transforms of matrix $\underline{G}(\omega)$ in equation (63) and are given by $$R_{11}(d, \tau) = N_1 e^{-(\alpha|v| + \beta)|\tau|} N_0 \delta(\tau)$$

$$R_{22}(d, \tau) = R_{11}(d, \tau)$$

$$R_{12}(d, \tau) = N_1 e^{-\alpha|d - v\tau| - \beta|\tau|}$$

$$R_{21}(d, \tau) = R_{12}(d, -\tau),$$

where $N_0\delta(\tau)$ represents the contribution of white noise to the total noise signal.

From equation (67), the signal-to-noise ratio (SNR) is $$SNR = \frac{1}{\pi}\int_{-\infty}^{\infty}|S(\omega)|^2\left(\frac{G_{c11} + N_o - G_{21}e^{-i\omega\tau}}{(G_{c11} + N_o)^2 - |G_{21}|^2}\right)d\omega.$$

Also, $$G_{c21} = \frac{2N_1}{(\alpha|v| - \beta + i\omega)}\left(\frac{(\alpha|v|)e^{-(\beta - i\omega)\frac{d}{|v|}}}{(\alpha|v| + \beta - i\omega)} - \frac{\beta e^{-\alpha d}}{(\alpha|v| + \beta + i\omega)}\right)$$

and $$G_{c11} = \frac{2N_1(\alpha v + \beta)}{\omega^2 + (\alpha v + \beta)^2} + N_o.$$

where $$S(\omega) = \begin{pmatrix}\text{Optical} \\ \text{Blur}\end{pmatrix} * \begin{pmatrix}\text{Detector} \\ \text{Aperture}\end{pmatrix}.$$

Figure 2:
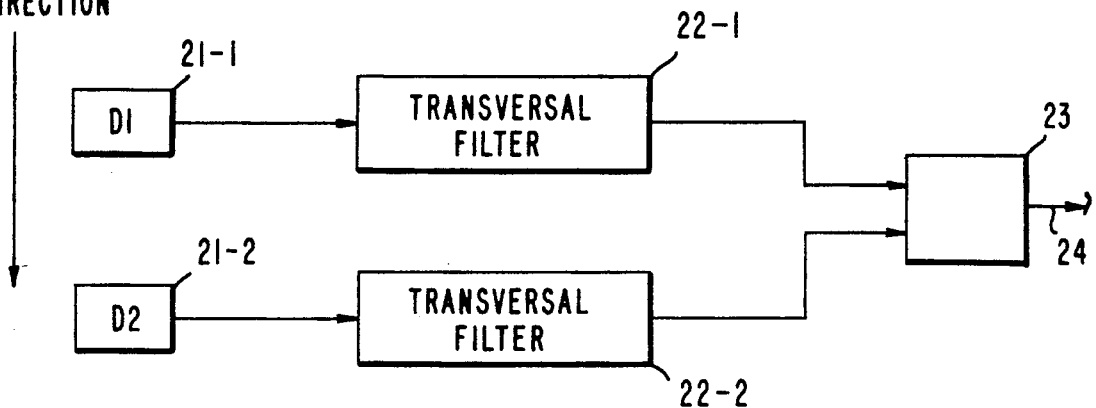
FIG. 2 illustrates a two detector implementation of the present invention.

Referring now to FIG. 2, there is shown a two detector implementation of the signal processing arrangement of the present invention. Shown in FIG. 2 are two detector elements 21-1, 21-2 whose outputs are coupled to transversal filters 21-1, 22-2. The outputs of the transversal filters 22-1, 22-2 are coupled to summation circuitry 23 which combines the received output signals into a single output signal 24 having a maximized signal-to-clutter ratio.

Figure 3:
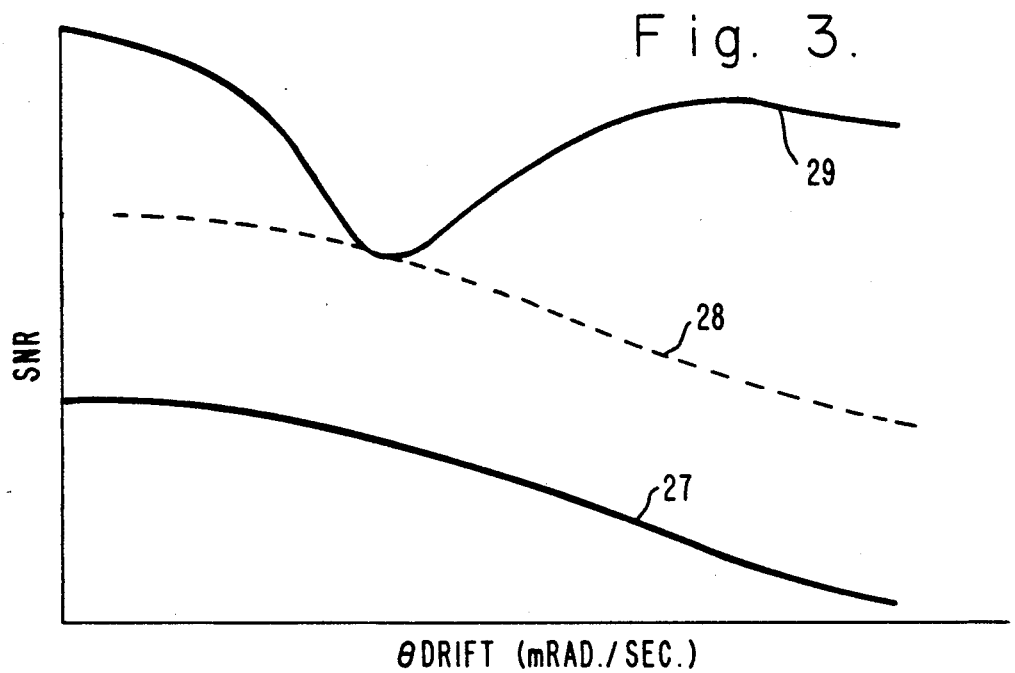
FIG. 3 illustrates a theoretical performance curve for the two detector filter of FIG. 2.

Theoretical performance curves for the embodiment of FIG. 2 and conventional one and two detector time-delay-integration systems are represented in FIG. 3. The curve labeled 27 is the conventional one detector performance, curve 28 is the conventional two detector performance, and curve 29 shows the performance of the filter of the present invention. These graphs show the performance improvement of the present invention over conventional systems. Shown in FIG. 3 are graphs of signal-to-noise ratio versus drift velocity, the drift rate of the background clutter across the detectors. The target speed across the detectors is fixed at 1 mrad/sec. For drift rates greater than 1 mrad/sec., the signal-to-noise ratio improves, and it stabilizes over a broad range of background drift rates for the two detector system. Both the single detector and two detector filter performances deteriorate at high drift rates because of increased clutter leakage.

FIGS. 4 through 7 show filter impulse response curves in terms of amplitude weighting versus time for drift velocities of 1, 3, 10 and 30 mrad/sec, respectively. The time delay between the positive peaks of these graphs are equal to the time delay between target centroid events on each detector. It can be seen from these graphs that in the two-detector situation, the shapes of the impulse response curves are time reversed.

Figure 4:
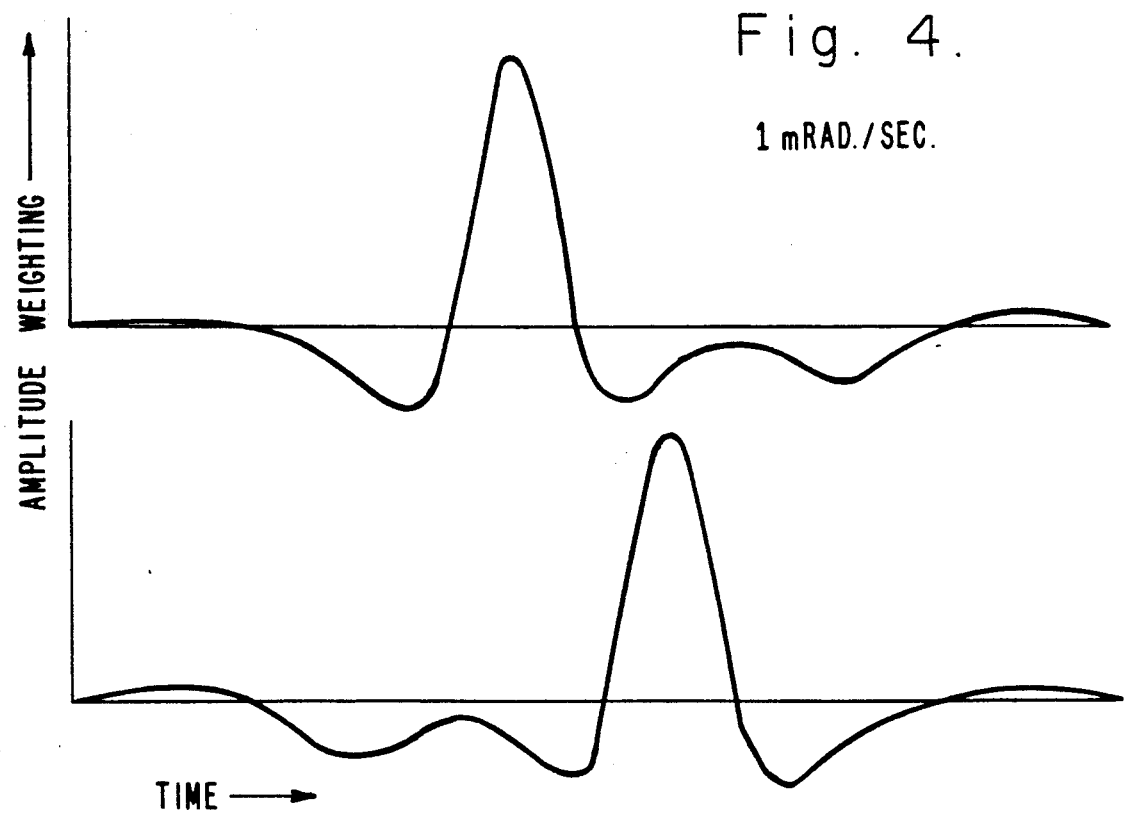
FIGS. 4 through 7 illustrate impulse response curves for the transversal filters of the system of FIG. 2 for various drift velocities.
Figure 5:
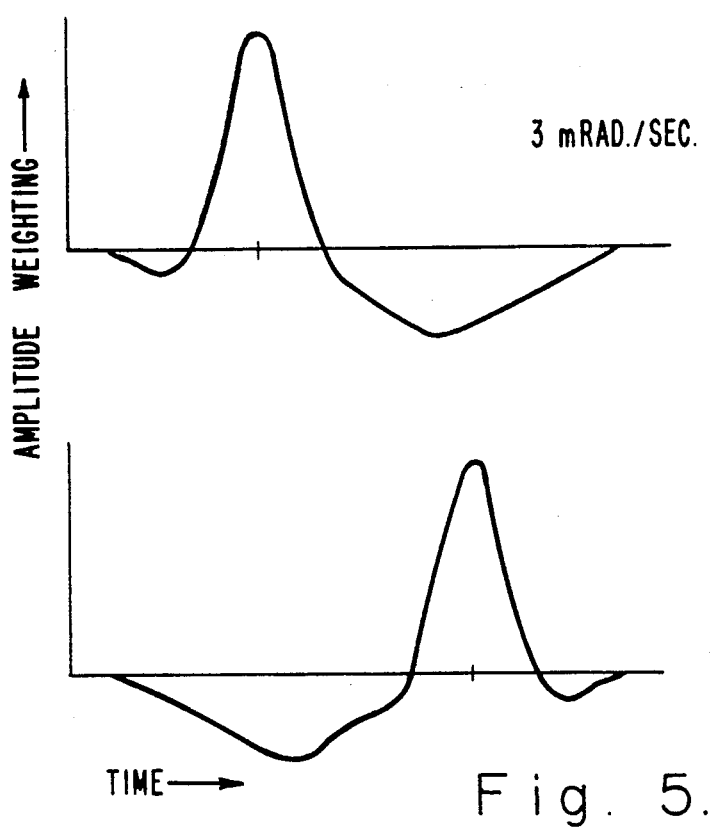
Figure 6:
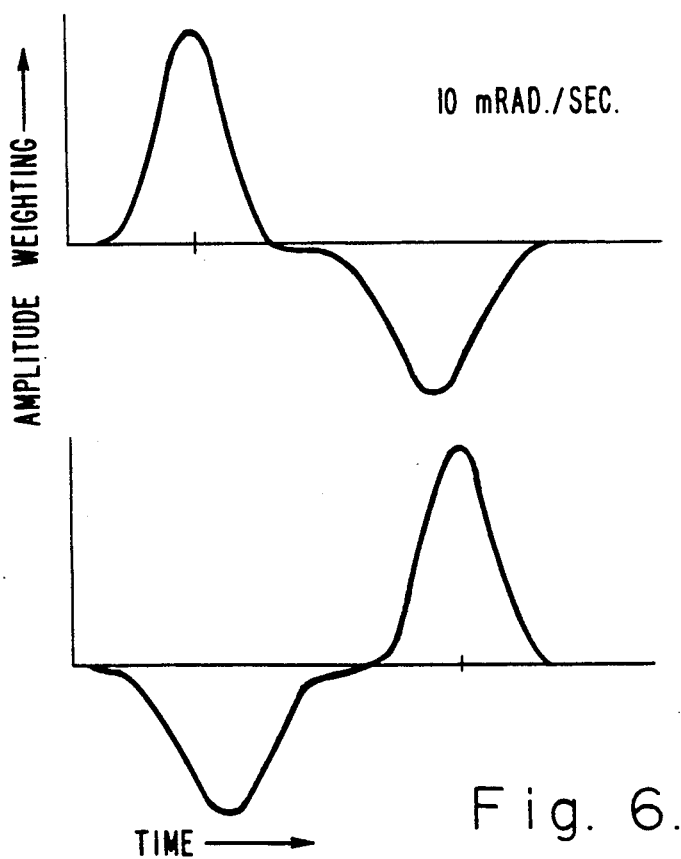
Figure 7:
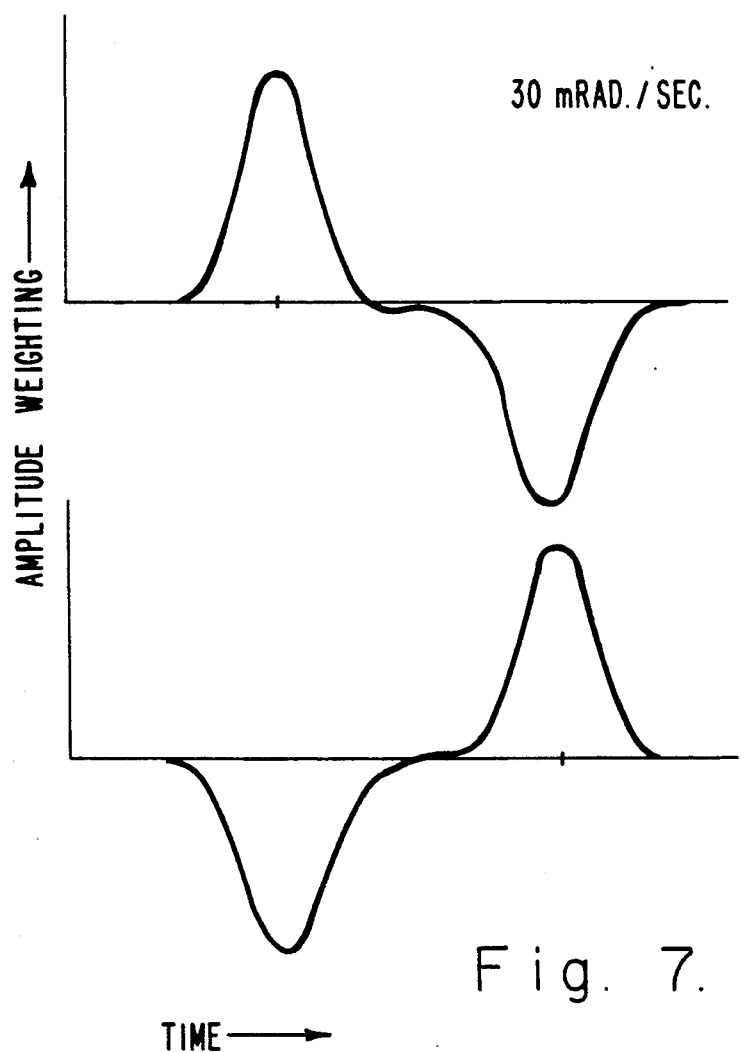

In FIGS. 4-7, the target motion over the detector array is fixed at one mrad/sec. Hence, FIG. 4 shows the impulse response moving at the same rate. The impulse response curves of FIG. 4 are not finite, and weak coupling is seen between detectors. In FIGS. 5-7, relative motion between target and background exists. In each case, the background is moving over the detector array faster than the target. Strong coupling is seen between detectors in the impulse response functions of FIGS. 5-7. These impulse response functions are finite and converge at high background drift rates to substantially symmetrical shapes.

Table I shows simulation results for a two-detector filter which is tuned to 10 mrad/sec. drift rate.

TABLE I

| θDRIFT | σ(1 DET) | σ(2 DET) |
|---|---|---|
| 1 mRAD/SEC | 229 | 235 |
| 5 mRAD/SEC | 228 | 62.8 |
| 10 mRAD/SEC | 254 | 53.7 |
| 10 mRAD/SEC (10% ΔR) | 254 | 58.5 |
| 10 mRAD/SEC (40% ΔR) | 254 | 123 |

The input data used for the simulation is a thermal image of the earth-looking background in a spectral waveband centered at 4.3 microns with undetermined correlation length. The simulation results confirm the dramatic performance improvement available with the filter of the present invention compared with a conventional single detector filter. Noise leakage (RMS noise at filter output) due to the cluttered thermal image of an earth background is reduced by a factor of 5 for a drift velocity of 10 mrad/sec., while the signal amplitude is doubled, giving a performance improvement of 17 db in signal-to-noise ratio for a clutter-dominated background. The bottom two rows of data indicate performance degradation when the two detectors have a difference in responsivity (ΔR) of 10% and 40%, respectively. Note that the filter of the present invention is relatively insensitive to variations in detector responsivity. The tap weights for the two detector filter used in the simulation are presented in Table II.

TABLE II

| TAP | FILTER WEIGHT | TAP | FILTER WEIGHT |
|---|---|---|---|
| T1 | −.01 | T26 | −.04 |
| T2 | −.01 | T27 | −.06 |
| T3 | −.02 | T28 | −.08 |
| T4 | −.02 | T29 | −.13 |
| T5 | −.02 | T30 | −.19 |
| T6 | 0.00 | T31 | −.27 |
| T7 | .05 | T32 | −.37 |
| T8 | .14 | T33 | −.48 |
| T9 | .28 | T34 | −.58 |
| T10 | .45 | T35 | −.66 |
| T11 | .65 | T36 | −.71 |
| T12 | .83 | T37 | −.72 |
| T13 | .95 | T38 | −.69 |
| T14 | 1.00 | T39 | −.62 |
| T15 | .95 | T40 | −.53 |
| T16 | .83 | T41 | −.43 |
| T17 | .65 | T42 | −.33 |
| T18 | .45 | T43 | −.24 |
| T19 | .28 | T44 | −.16 |
| T20 | .14 | T45 | −.11 |
| T21 | .05 | T46 | −.07 |
| T22 | 0.00 | T47 | −.04 |
| T23 | −.02 | T48 | −.02 |
| T24 | −.03 | T49 | −.01 |
| T25 | −.03 | | |

Figure 8:
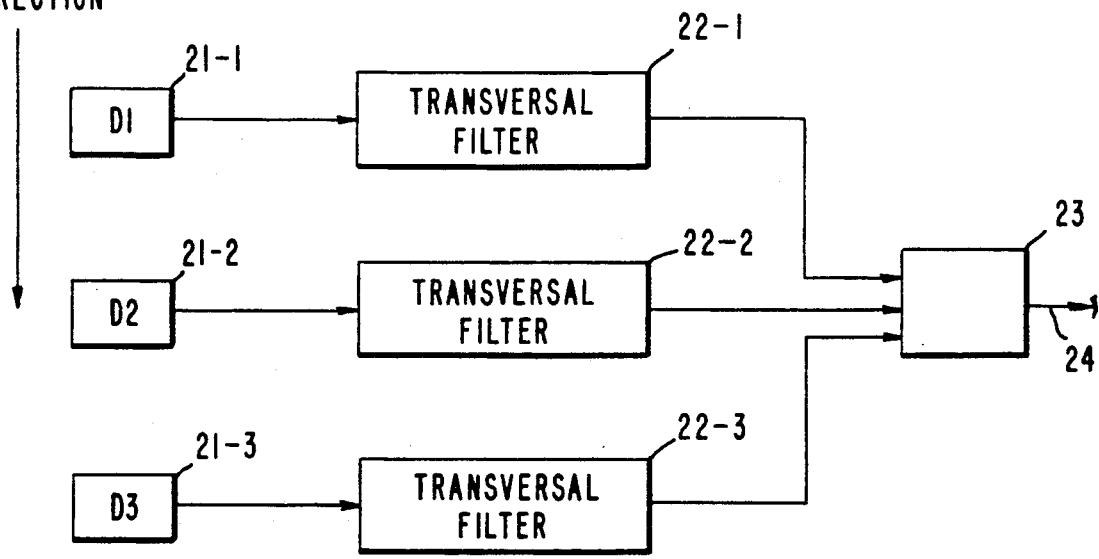
FIG. 8 illustrates a three detector implementation of the present invention.

Referring to FIG. 8, there is shown a three detector implementation of the vector filter of the present invention. Shown therein are three detector elements 21-1, 21-2, 21-3 whose outputs are coupled to respective transversal filters 22-1, 22-2, 22-3. The outputs of the transversal filters 22 are coupled to summing circuitry 23 which sums the outputs of the transversal filters 22 to provide a maximized signal-to-noise output signal 24.

Figure 10:
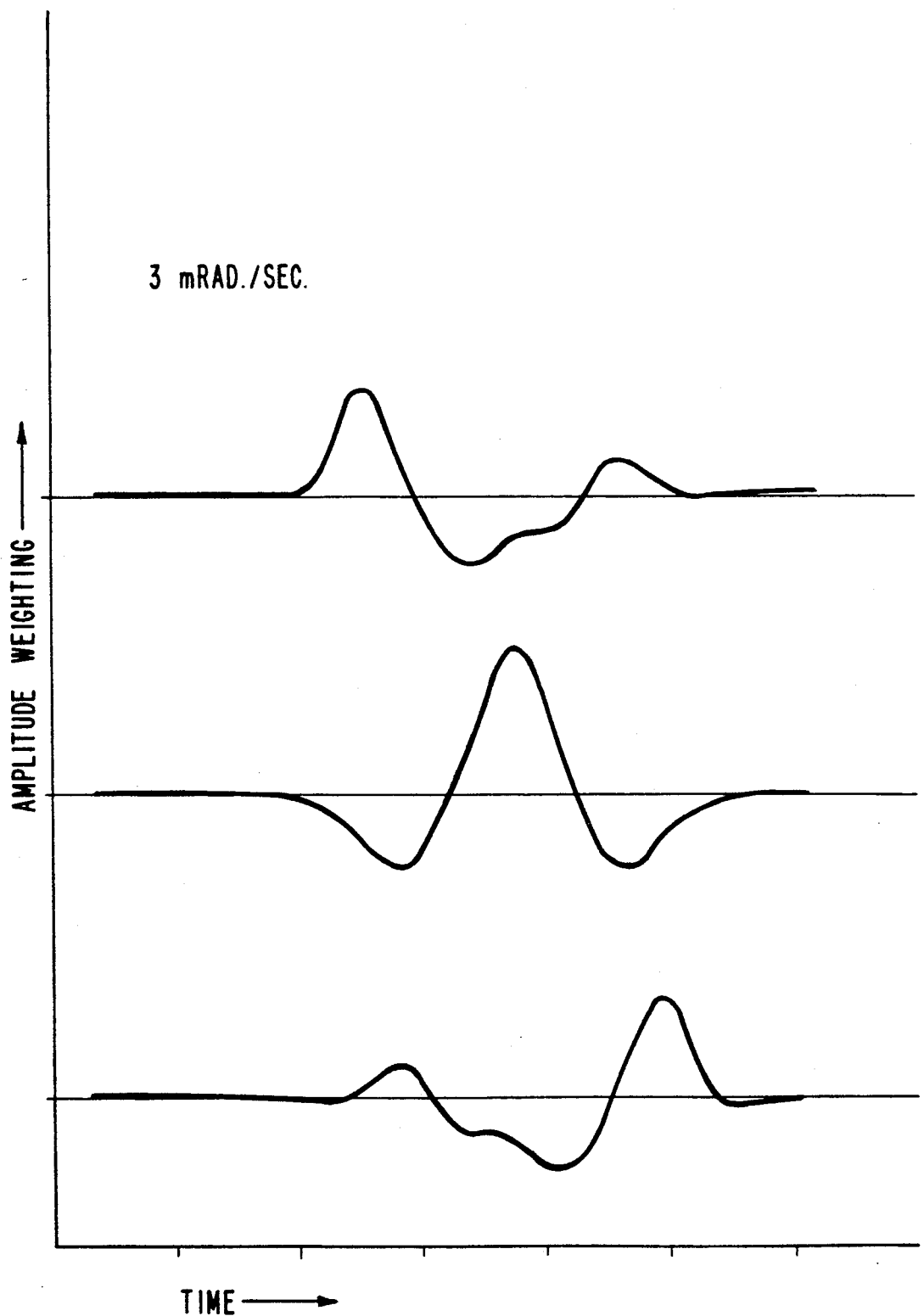
Figure 11:
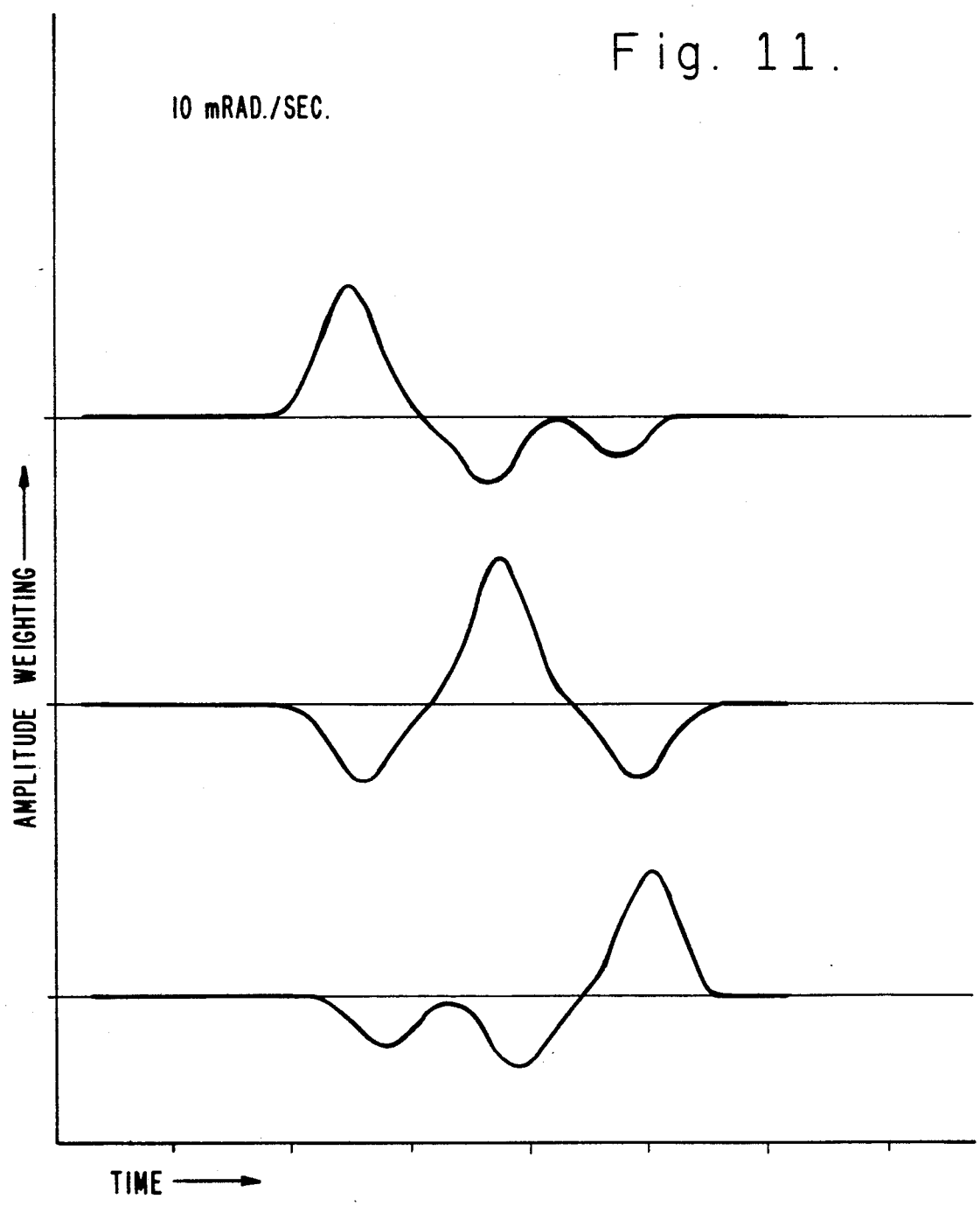

FIGS. 9-11 present optimized impulse response curves for the three detector system of FIG. 8 for drift ratios of 1, 3 and 10 mrad/sec, respectively. In FIGS. 9-11, the impulse response functions shown therein are such that the bottom curves are associated with the first detector to view the image scene and the top curves associated with the third detector to view the scene.

The target is moving at a one mrad/sec rate in each of FIGS. 9-11. Again, as in the two detector case, when zero relative motion exists between target and background (FIG. 9), weak coupling between detectors is observed and the impulse response functions are not finite. When relative motion exists between target and background (FIGS. 10 and 11), strong coupling between detectors is observed and the impulse response functions are finite. As may be seen from FIGS. 9-11, the impulse response curves of the first and third detectors are time reversed, while the center detector has a symmetrically shaped impulse response associated therewith.

Figure 12:
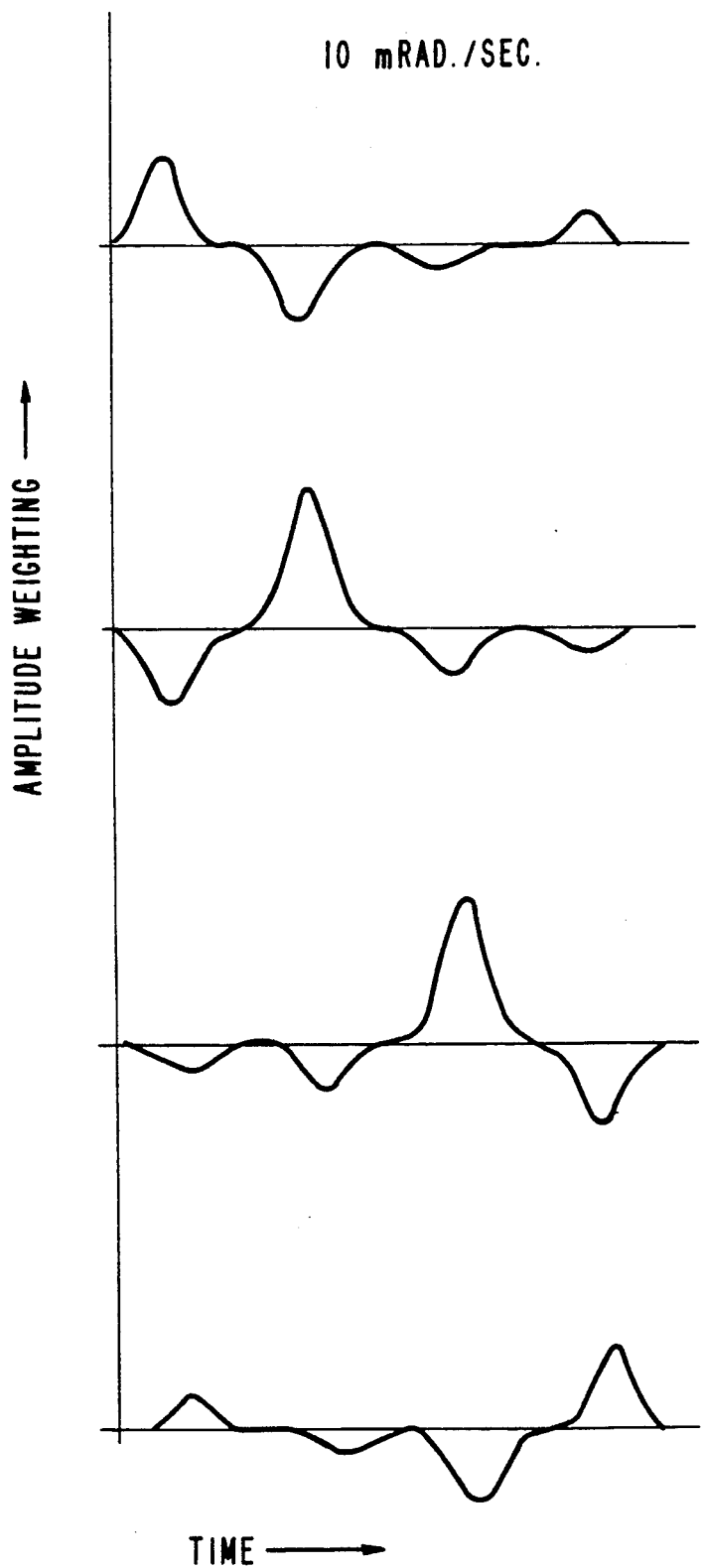
FIG. 12 shows filter response curves for a four detector implementation of the present invention.

Referring to FIG. 12, impulse response functions for a four detector implementation of the filter of the present invention are shown. As may be seen from these graphs, the filter impulse responses for both the first and fourth detectors, and the second and third detectors, of the filter are time reversed. The impulse responses shown are for a target velocity of one mrad/sec. and background rate of 10 mrad/sec. Strong coupling is demonstrated between all detectors as is evidenced by the graphs. The time delay between adjacent positive peaks is equal to the time delay between target centroid on adjacent detectors.

Filter transfer functions for the N-detectors case may be derived by solving the following equations:

$$\underline{H}(\omega) = \underline{S}(\omega)\,\underline{G}^{-1}(\omega),$$

where $$\underline{H}(\omega) = (H_1(\omega), H_2(\omega), \ldots H_N(\omega))$$

$$\underline{S}(\omega) = S(\omega)\,(1, e^{i\omega\tau}, \ldots e^{(N-1)i\omega\tau})$$

and $$\underline{G}(\omega) = \int_{-\infty}^{\infty} e^{-i\omega t} \underline{R}(t)dt + N_o\underline{I}.$$

where R(t) is given by $$\underline{R}(t) = N_1 e^{-\beta|t|} \begin{pmatrix} e^{-\alpha|v||t|} & e^{-\alpha|d-vt|} & \cdots & e^{-\alpha|(N-1)d-vt|} \\ e^{-\alpha|d+vt|} & e^{-\alpha|v||t|} & & \\ \vdots & & \ddots & \\ e^{-\alpha|(N-1)d+vt|} & & \cdots & e^{-\alpha|v||t|} \end{pmatrix}$$

In the above equations, $H_i(\omega)$ is the transfer function for the ith detector, N is the number of detectors in the linear array, $\tau$ is the time delay between arrivals of target energy between adjacent detectors, $N_1$ is the clutter process power, $N_o$ is the white noise process power, $\beta$ is the inverse correlation time, $\alpha$ is the inverse correlation length, v is the clutter drift velocity over the detectors, d is the spacing between adjacent detectors, t is time, and w is angular frequency.

The filter impulse response functions for each detector are Fourier transforms of the filter transfer functions, and are given by $$h_i(t) = \frac{1}{2\pi} \int_{-\infty}^{\infty} e^{-i\omega t} H_i(\omega)d\omega$$

where $h_i(t)$ is the impulse response for the ith detector, and $$\underline{h}(t) = (h_1(t), h_2(t), \ldots h_N(t))$$

Solutions of this equation for N=2, 3 and 4 were provided hereinabove (See FIGS. 4–7 and 9–12). The specific values of the parameters utilized are $N_o=1$, $N_1=1\times 10^6$, $\alpha=7.5\times 10^{-5}$ cycles/$\mu$rad, $\beta=0.1$ cycles/sec., v=DRIFT, in mrad/sec, d=25 $\mu$rad and the target velocity v=1.0 mrad/sec.

Figure 13:
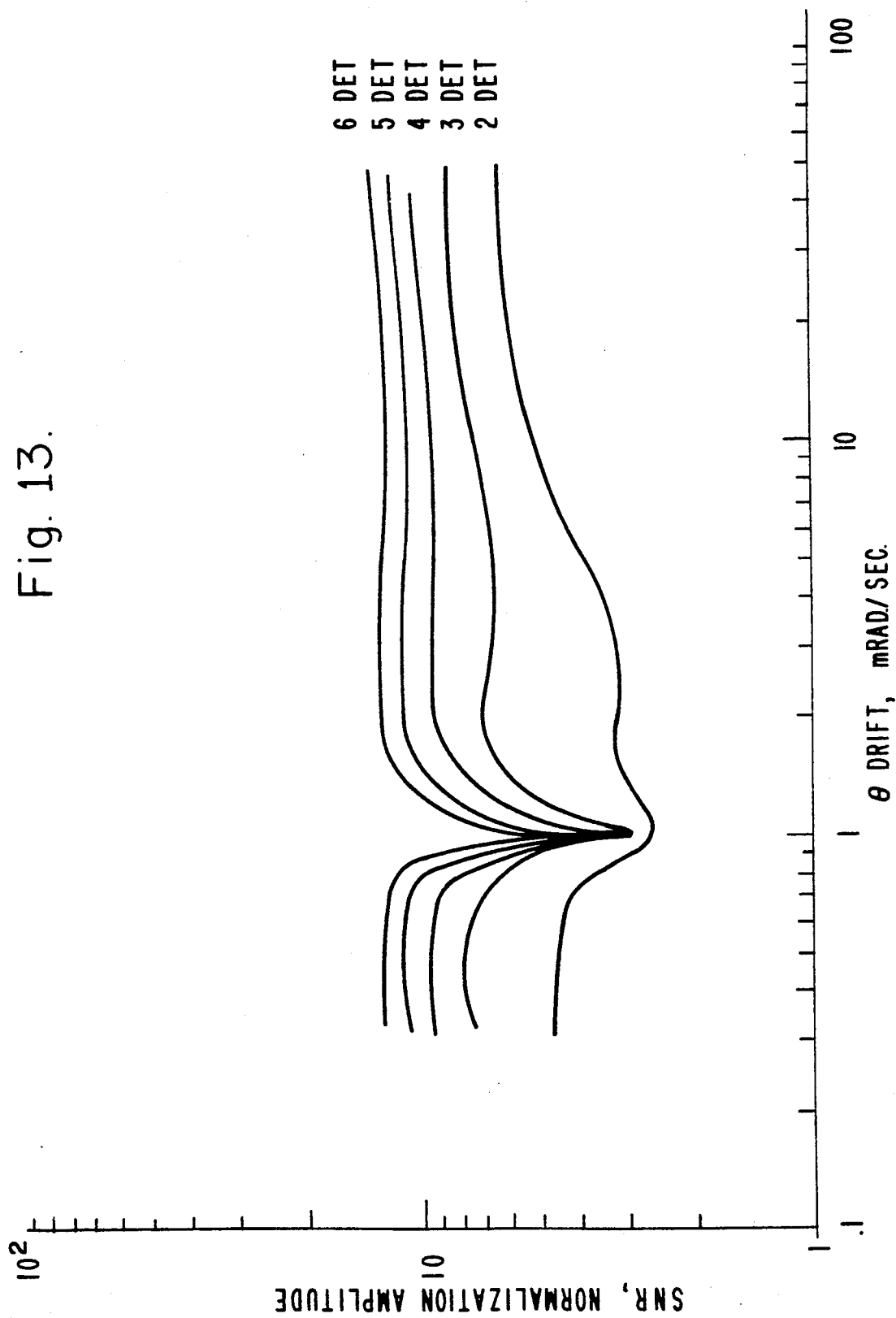
FIG. 13 is a graph illustrating the performance improvement of the filter of the present invention.

FIG. 13 illustrates the overall performance improvement provided by the filter of the present invention. FIG. 13 shows graphs of signal-to-noise ratio versus drift velocity for filters employing two through six detector elements, where the noise is comprised of clutter and white noise. The steepening of the slope of the graphs around the target velocity of interest (1 mrad/sec.) as the number of detectors employed increases illustrates the dramatic improvement provided by the filter of the present invention.

Figure 14:
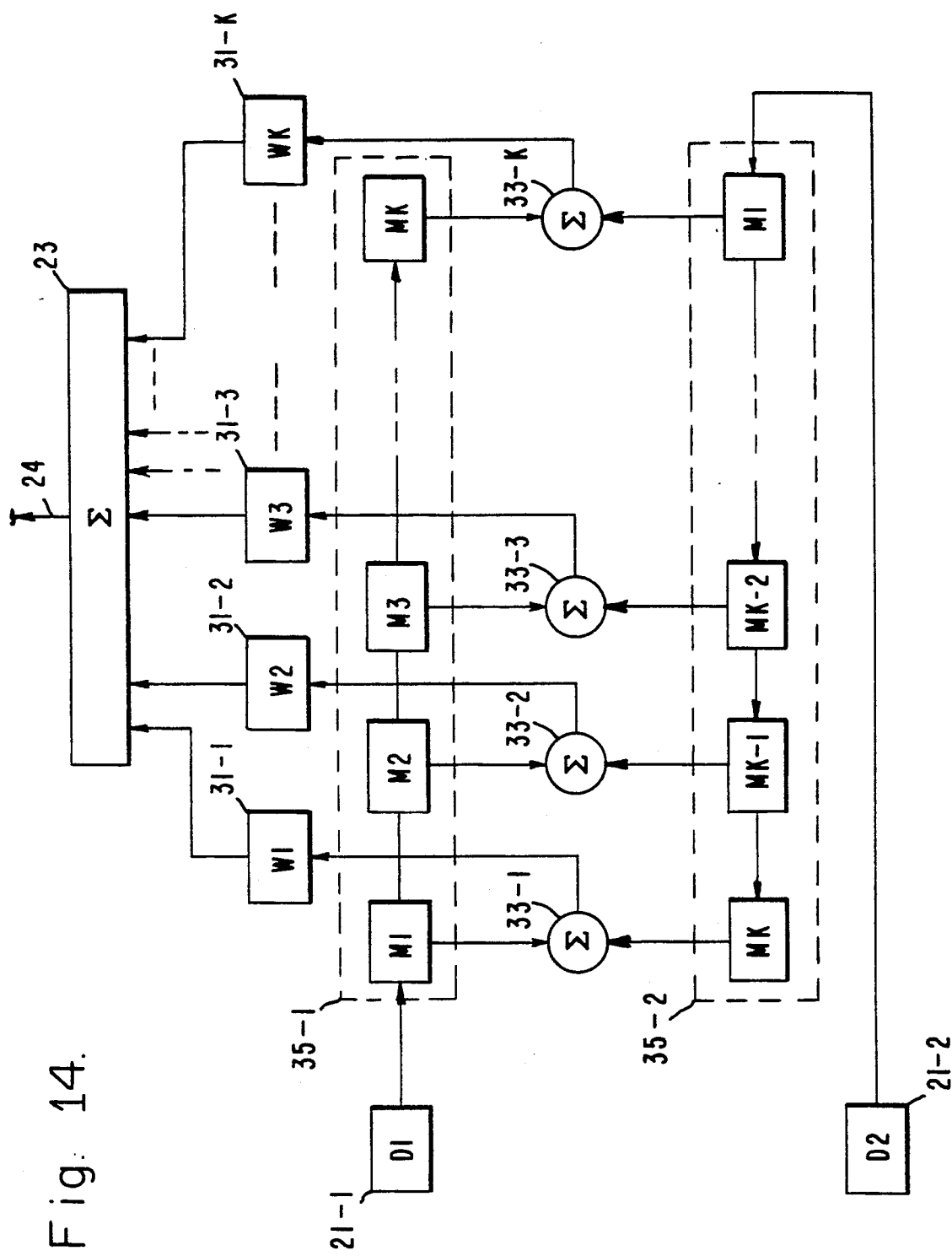
FIG. 14 shows an alternative embodiment of the present invention for a two detector implementation.

FIG. 14 represents an alternative embodiment of a filter for use in the two detector implementation. This implementation provides for a more efficient design in terms of speed of operation. This design takes advantage of the time-reversed nature of the impulse response curves which allows the application of weighting factors only once for the entire filter instead of applying the weighting factors separately to signals from each detector. This implementation may be employed in any filter where pairs of detectors have time-reversed impulse functions. From the description provided above, all of the filters employing an even number of detector elements may utilize this alternative design. Also, certain of the filter functions in the filters employing odd numbers of detectors, such as in the three detector case above, may employ this design.

As shown in FIG. 14, the alternate filter embodiment comprises two detector elements 21-1, 21-2, which are coupled through delay lines 35-1, 35-2, respectively. Outputs of each element of the delay lines 35-1, 35-2, identified as Ml-Mk, are coupled to a plurality of summing devices 33-1, 33-2, ... 33-K. The signal flow and summing operation performed by the delay lines 35 and summing devices 33 acts to time reverse the signals received by the detectors 21-1, 21-2.

The outputs of the summing devices 33-1, ... 33-K are individually coupled to circuitry 31-1, ... 31-K which applies individual weighting factors to the summed signals provided by each of the summing devices 33. The outputs of the circuitry 31 are coupled to summing circuitry 23 which sums all of the signals applied thereto by the circuitry 31 to produce the output 24 of the filter. Only one set of weighting factors is required and the impulse response curve associated with the filter is given by the lower curve in FIG. 4.

Thus, there has been provided a new and improved signal processing arrangement, or vector filter, which may be employed in a passive optical target detection system. This system shows dramatic improvement over conventional time-delayed-integration systems, and may be implemented in a variety of filter configurations.

It is to be understood that the above described embodiments are merely illustrative of some of the many specific embodiments which represent applications of the principles of the present invention. Clearly, numerous and varied other arrangements may be readily devised by those skilled in the art without departing from the spirit and scope of the invention.

What is claimed is:

1. A signal processing arrangement comprising:
  a plurality of detector elements which view an image scene;
  a plurality of transversal filters coupled to said plurality of detector elements in one-to-one correspondence therewith for amplitude weighting output signals provided thereby as a function of time, each of said transversal filters having a predetermined impulse response which is different from those of each of said other transversal filters; and
  summing means coupled to each of said transversal filters for combining output signals provided thereby to provide a single output signal of said arrangement.

2. A signal processing arrangement comprising:
  a plurality of detector elements which view an image scene;
  a plurality of transversal filters coupled to said plurality of detector elements in one-to-one corresponding therewith for amplitude weighting output signals provided thereby as a function of time, each of said transversal filters having a predetermined impulse response which is different from those of each of said other transversal filters; and
  summing means coupled to each of said transversal filters for combining output signals provided thereby to provide a single output signal of said arrangement;
  said impulse responses of said transversal filters being such that, when objects traveling at a first velocity are sequentially viewed by said plurality of detector elements, the amplitude weighting provided by said filters has a time delay which applies maximum weighting factors to signals indicative of the objects moving at said first velocity for all said transversal filters, said summing means thus providing a maximized signal indicative of said objects moving at said first velocity, and said impulse responses being such that for other velocities, said summing means substantially minimizes the output signals relative to said first velocity, said output signals being minimized for signals indicative of objects traveling at a second velocity.

3. A signal processing arrangement comprising:
a linear plurality of detector elements which view an image scene;
a plurality of transversal filters coupled to said plurality of detector elements in one-to-one correspondence therewith for amplitude weighting output signals provided thereby as a function of time, each of said transversal filters having a predetermined impulse response which is different from those of each of said other transversal filters; and
summing means coupled to each of said transversal filters for combining output signals provided thereby to provide a single output signal of said arrangement.

4. A signal processing arrangement comprising:
a linear plurality of detector elements which view an image scene;
a plurality of transversal filters coupled to said plurality of detector elements in one-to-one correspondence therewith for amplitude weighting output signals provided thereby as a function of time, each of said transversal filters having a predetermined impulse response which is different from those of each of said other transversal filters; and
summing means coupled to each of said transversal filters for combining output signals provided thereby to provide a single output signal of said arrangement;
said impulse responses of said transversal filters being such that, when objects traveling at a first velocity are sequentially viewed by said plurality of detector elements, the amplitude weighting provided by said filters has a time delay which applies maximum weighting factors to signals indicative of the objects moving at said first velocity for all said transversal filters, said summing means thus providing a maximized signal indicative of said objects moving at said first velocity, and said impulse responses being such that for other velocities, said summing means substantially minimizes the output signals relative to said first velocity, said output signals being minimized for signals indicative of objects traveling at a second velocity.

5. A signal processing arrangement, for processing signals received by a linear plurality of detector elements which view an image scene, and for providing output signals which are maximized for objects traveling at a first velocity within said image scene and minimized for objects traveling at a second velocity within said scene, said arrangement comprising:
a plurality of transversal filters coupled to said plurality of detector elements in one-to-one correspondence therewith for amplitude weighting output signals provided thereby as a function of time, each of said transversal filters having a predetermined impulse response which is different from those of each of said other transversal filters; and
summing means coupled to each of said transversal filters for combining output signals provided thereby to provide a single output signal of said arrangement.

6. A signal processing arrangement, for processing signals received by a linear plurality of detector elements which view an image scene, and for providing output signals which are maximized for objects traveling at a first velocity within said image scene and minimized for objects traveling at a second velocity within said scene, said arrangement comprising:
a plurality of transversal filters coupled to said plurality of detector elements in one-to-one correspondence therewith for amplitude weighting output signals provided thereby as a function of time, each of said transversal filters having a predetermined impulse response which is different from those of each of said other transversal filters; and
summing means coupled to each of said transversal filters for combining output signals provided thereby to provide a single output signal of said arrangement;
said impulse responses of said transversal filters being such that, when objects traveling at said first velocity are sequentially viewed by said plurality of detector elements, the amplitude weighting provided by said filters has a time delay which applies maximum weighting factors to signals indicative of the objects moving at sad first velocity for all of said transversal filters, said summing means thus providing a maximized signal indicative of said objects moving at said first velocity, and said impulse responses being such that for other velocities, said summing means substantially minimizes the output signals relative to said first velocity, said output signals being minimized for signals indicative of objects traveling at said second velocity.

7. A signal processing arrangement comprising:
a plurality of detector elements which view an image scene;
a plurality of delay lines coupled to said plurality of detector elements in one-to-one correspondence therewith, each of said delay lines having a plurality of outputs each of which is different from those of each of said other delay lines;
a plurality of first summing devices individually coupled to preselected pairs of outputs of said plurality of delay lines;
a plurality of weighting means individually coupled to respective ones of said plurality of first summing devices for applying predetermined weighting factors to signals provided by said plurality of summing devices; and
second summing means coupled to said plurality of weighting means for combining output signals provided by said plurality of weighting means.

8. A method of processing signals received by a plurality of detector elements which view an image scene to provide output signals which are maximized for objects traveling at a first velocity within said image scene and minimized for objects traveling at a second velocity within said scene, said method comprising the steps of:
delaying signals uniquely provided by each of said detector elements in a predetermined plurality of time intervals and in one-to-one correspondence therewith;

amplitude weighting each of said time delayed signals by predetermined amplitude weighting factors;

said amplitude weighting factors being such that the time delay between peak weighting factors applied to signals from adjacent detector elements is substantially identical to the time delay between the arrival of energy from objects traveling at said first velocity on said adjacent detector elements;

summing all of said amplitude-weighted time-delayed signals associated with a particular detector; and summing all of the summed amplitude-weighted time-delayed signals to provide a signal output signal.

* * * * *